US008533102B2

(12) United States Patent
West et al.

(10) Patent No.: US 8,533,102 B2
(45) Date of Patent: *Sep. 10, 2013

(54) SYSTEM AND METHOD FOR MONEY MANAGEMENT USING A PLURALITY OF PROFIT LEVELS IN AN ELECTRONIC TRADING ENVIRONMENT

(75) Inventors: Robert A. West, Chicago, IL (US);
Michael J. Burns, Chicago, IL (US);
Peter F. Ziemkiewicz, Chicago, IL (US);
Ryan J. Highland, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 543 days.

This patent is subject to a terminal disclaimer.

(21) Appl. No.: 12/718,946

(22) Filed: Mar. 5, 2010

(65) Prior Publication Data

US 2010/0161476 A1    Jun. 24, 2010

Related U.S. Application Data

(63) Continuation of application No. 10/447,382, filed on May 29, 2003, now Pat. No. 7,707,098, which is a continuation-in-part of application No. 10/355,471, filed on Jan. 31, 2003, now Pat. No. 7,752,117.

(51) Int. Cl.
*G06Q 40/00* (2012.01)

(52) U.S. Cl.
USPC .......................................................... 705/37

(58) Field of Classification Search
USPC .......................................................... 705/37
See application file for complete search history.

(56) References Cited

U.S. PATENT DOCUMENTS

| 4,674,044 A | * | 6/1987 | Kalmus et al. ............. 705/37 |
| 4,799,156 A | | 1/1989 | Shavit et al. |

(Continued)

FOREIGN PATENT DOCUMENTS

| WO | 00/48113 | 8/2000 |
| WO | 00/65510 | 11/2000 |

OTHER PUBLICATIONS

International Search Report for PCT App. No. PCT/US04/002843, Mar. 9, 2006.

(Continued)

*Primary Examiner* — Jessica Lemieux
(74) *Attorney, Agent, or Firm* — McDonnell Boehnen Hulbert & Berghoff LLP

(57) ABSTRACT

A system and method for money management in an electronic trading environment are presented. According to one embodiment, a money management application intercepts an order before the order is sent to an exchange, and determines a plurality of P/L levels, based on which the money management application then selects a set of money management parameters to be used to control or modify order parameters before the order is sent to the exchange. The plurality of profit levels may include a net profit level determined based on a trader's net position and a current market level, a realized profit level determined based on trader's sells and buys associated with the tradeable object, or an open profit level determined based on the realized and net profit levels. The set of money management parameters may include a maximum order quantity and a maximum net position so that, for example, if the order quantity associated with the order is higher than the maximum order quantity associated with the applicable set of money management parameters, the order quantity may be modified to the maximum order quantity.

18 Claims, 15 Drawing Sheets

(56) References Cited

U.S. PATENT DOCUMENTS

| | | | |
|---|---|---|---|
| 4,980,826 | A | 12/1990 | Wagner |
| 5,038,284 | A | 8/1991 | Kramer |
| 5,799,287 | A | 8/1998 | Dembo |
| 6,317,727 | B1 | 11/2001 | May |
| 6,408,282 | B1 | 6/2002 | Buist |
| 6,772,132 | B1 | 8/2004 | Kemp, II et al. |
| 6,829,589 | B1 | 12/2004 | Saliba |
| 7,072,863 | B1 | 7/2006 | Philips et al. |
| 7,127,424 | B2 | 10/2006 | Kemp, II et al. |
| 7,155,410 | B1 | 12/2006 | Woodmansey et al. |
| 7,162,447 | B1 | 1/2007 | Cushing |
| 7,177,833 | B1 | 2/2007 | Marynowski et al. |
| 7,251,629 | B1 | 7/2007 | Marynowski et al. |
| 7,376,614 | B1 | 5/2008 | Scheinberg et al. |
| 7,389,263 | B2 * | 6/2008 | Gladstone ............ 705/37 |
| 7,389,268 | B1 | 6/2008 | Kemp, II et al. |
| 7,529,704 | B1 | 5/2009 | Breslow et al. |
| 7,565,315 | B2 | 7/2009 | West et al. |
| 7,580,882 | B2 | 8/2009 | West et al. |
| 7,584,143 | B2 | 9/2009 | West et al. |
| 7,587,356 | B2 | 9/2009 | West et al. |
| 7,620,579 | B2 | 11/2009 | West et al. |
| 2001/0027434 | A1 | 10/2001 | Alaia et al. |
| 2002/0004774 | A1 | 1/2002 | Defarlo |
| 2002/0103742 | A1 | 8/2002 | Billings et al. |
| 2002/0107786 | A1 * | 8/2002 | Lehmann-Haupt et al. .... 705/37 |
| 2002/0116317 | A1 | 8/2002 | May |
| 2002/0133455 | A1 | 9/2002 | Howorka et al. |
| 2002/0178099 | A1 | 11/2002 | Young |
| 2002/0188544 | A1 | 12/2002 | Wizon et al. |
| 2003/0009419 | A1 | 1/2003 | Chavez et al. |
| 2003/0041006 | A1 | 2/2003 | Bunda |
| 2003/0139989 | A1 | 7/2003 | Churquina |
| 2003/0158804 | A1 | 8/2003 | Francis et al. |
| 2003/0167146 | A1 | 9/2003 | Tezuka et al. |
| 2003/0233325 | A1 | 12/2003 | Belyi |
| 2004/0034587 | A1 | 2/2004 | Amberson et al. |
| 2004/0153391 | A1 | 8/2004 | Burns et al. |
| 2004/0153392 | A1 | 8/2004 | West et al. |
| 2004/0153394 | A1 | 8/2004 | West et al. |
| 2006/0195386 | A1 | 8/2006 | Glodjo et al. |
| 2006/0259396 | A1 | 11/2006 | Burns et al. |
| 2006/0259401 | A1 | 11/2006 | West et al. |
| 2006/0259402 | A1 | 11/2006 | West et al. |
| 2009/0276352 | A1 | 11/2009 | Burns et al. |
| 2009/0276353 | A1 | 11/2009 | Burns et al. |
| 2010/0280938 | A1 | 11/2010 | Burns et al. |
| 2012/0254014 | A1 | 10/2012 | West et al. |

OTHER PUBLICATIONS

International Search Report for PCT App. No. PCT/US04/002838, Aug. 18, 2005.
International Search Report for PCT App. No. PCT/US04/002848, Mar. 9, 2006.
GL Trade, GL Trade User Guide V4.60 LIFFE Connect for Futures, Jun. 1999, London, United Kingdom.
Burns et al., U.S. Appl. No. 13/235,180, filed Sep. 16, 2011, all pages.
Burns et al., U.S. Appl. No. 12/718,947, filed Mar. 5, 2010.

* cited by examiner

MONEY MANAGER SETUP 900

PROFILE NAME 902

TRADEABLE OBJECT 904

| FILTER 906 | THRES. 908 | RETRAC. LEVEL 910 | MAX QTY 912 | MAX POS 914 |
|---|---|---|---|---|
| O P/L | 0 | | 2 | 5 |
| O P/L | 10 | -10 | 3 | 0 |
| O P/L | | 7 | 5 | 10 |
| O P/L | | 5 | 3 | 6 |
| O P/L | 20 | 15 | 10 | 0 |
| O P/L | | 13 | 5 | 20 |
| O P/L | | | 5 | 10 |
| | | | | 0 |

916 Save
918 Delete
920 Cancel

FIG. 9

| MONEY MANAGER MONITOR 1000 | | | | | | | | | |
|---|---|---|---|---|---|---|---|---|---|
| PROFILE 1002 | TRAD. OBJ. 1004 | LIMITS ON 1006 | WRK ORD 1008 | NET POS 1010 | MAX P/L 1012 | MIN P/L 1014 | CURR. P/L 1016 | LIMITS IN EFFECT 1018 | |
| | | | | | | | | MAX POS | MAX QTY |
| | | ☐ | | | | | | | |
| | | ☐ | | | | | | | |
| | | ☐ | | | | | | | |
| | | ☐ | | | | | | | |
| | | ☐ | | | | | | | |
| | | ☐ | | | | | | | |
| | | ☐ | | | | | | | |

FIG. 10

SYSTEM AND METHOD FOR MONEY MANAGEMENT USING A PLURALITY OF PROFIT LEVELS IN AN ELECTRONIC TRADING ENVIRONMENT

CROSS REFERENCE TO RELATED APPLICATIONS

This application is a continuation of U.S. patent application Ser. No. 10/447,382, filed on May 29, 2003, entitled "System and Method for Money Management Using a Plurality of Profit Levels in an Electronic Trading Environment," now U.S. Pat. No. 7,707,098, which is a continuation-in-part of U.S. patent application Ser. No. 10/355,471, filed on Jan. 31, 2003, entitled "System and Method for Money Management in Electronic Trading Environment," now U.S. Pat. No. 7,752,117, the contents of all of which are fully incorporated herein by reference.

FIELD OF INVENTION

The present invention is directed towards electronic trading. More specifically, the present invention is directed to tools for controlling trader's trading, assisting a trader in risk analysis, and making profitable trades in an electronic trading environment.

BACKGROUND

Trading methods have evolved from a manually intensive process to a technology enabled, electronic platform. With the advent of electronic trading, a user or trader can be in virtually direct contact with the market, from practically anywhere in the world, performing near real-time transactions, and without the need to make personal contact with a broker.

Electronic trading is generally based on a host exchange, one or more computer networks, and client devices. In general, the host exchange includes one or more centralized computers to form the electronic heart. Its operations typically include order matching, maintaining order books and positions, price information, and managing and updating a database that records such information. The host exchange is also equipped with an external interface that maintains uninterrupted contact to the client devices and possibly other trading-related systems.

Using client devices, market participants or traders link to the host exchange through one or more networks. A network is a group of two or more computers or devices linked together. There are many types of wired and wireless networks such as local area networks and wide area networks. Networks can also be characterized by topology, protocol, and architecture. For example, some market participants may link to the host through a direct connection such as a T1 or ISDN. Some participants may link to the host exchange through direct connections and through other common network components such as high-speed servers, routers, and gateways. The Internet, a well-known collection of networks and gateways, can be used to establish a connection between the client device and the host exchange. There are many different types of networks and combinations of network types known in the art that can link traders to the host exchange.

Regardless of the way in which a connection is established, software running on the client devices allows market participants to log onto one or more exchanges and participate in at least one market. A client device is a computer such as a personal computer, laptop computer, hand-held computer, and so forth that has network access. In general, client devices run software that creates specialized interactive trading screens. Trading screens enable market participants to obtain market quotes, monitor positions, and submit orders to the host.

Generally, when an order is submitted to a host exchange, the host checks the conditions associated with the order, for example price and quantity, and prioritizes the order with other orders of the same price. When the order conditions are satisfied in the market, a trade occurs and trade information is then relayed in some fashion to one or more client devices. In fact, the host exchanges typically publish a data feed to the client devices so that the traders can have access to the most current market information.

Market information commonly includes information regarding the inside market and market depth. The inside market is the lowest sell price in the market and the highest buy price in the market at a particular point in time. Market depth refers to quantities available at the inside market and may also refer to quantities available at other prices away from the inside market. The quantity available at a given price level is usually provided by the host exchange in aggregate sums. In other words, a host exchange usually provides the total buy or the total sell quantity available in the market at a particular price level in its data feed. The extent of the market depth available to a trader usually depends on the host exchange. For instance, some host exchanges provide market depth for all price levels, while some provide only quantities associated with the inside market, and others may provide no market depth at all. Additionally, host exchanges can offer other types of market information such as the last traded price (LTP), the last traded quantity (LTQ), and order fill information.

To profit in electronic markets, market participants must be able to assimilate large amounts of data, including market information provided by an exchange, and, accordingly, react quicker than other competing market participants to take advantage of profitable market conditions. Further, because electronic trading offers tools that enable traders to react to the market so much faster than in the traditional pit environment, a trader risks and may lose a lot of money so much quicker. It is therefore desirable to offer tools that can assist a market participant in adapting his or her trading strategy to an electronic marketplace, help the participant to make desirable trades, as well as provide means for money management and risk analysis.

BRIEF DESCRIPTION OF THE DRAWINGS

Example embodiments of the present invention are described herein with reference to the following drawings, in which:

FIG. 9 is a block diagram illustrating an example money management interface for defining filter criteria and filter conditions;

FIG. 10 is a block diagram illustrating an example monitoring interface that allows a trader to view market conditions and limitations imposed on each tradeable object or a group of the tradeable objects associated with the created filters;

DETAILED DESCRIPTION

I. Money Management Overview

The present invention provides a system that preferably operates as a money management tool by dynamically modifying an order parameter such as an order quantity to prevent or reduce losses or increase trader's profits. That is, it preferably operates as a trader's conscience or an automatic trading tool that prevents a trader from losing money by restricting certain orders from being sent to the exchange and/or by modifying the orders before they are sent to the exchange. By reducing potential losses that might have been caused by such unchanged orders, a trader or trading house can benefit with increased profits. Additionally, the system can be programmed to dynamically loosen the restrictions set on certain orders when the trader or automatic trading tool is making money. Advantages, including those described directly above, will become readily apparent to one skilled in the art upon reading the description herein.

Generally, according to a preferred embodiment, a trader or some automatic trading tool sends an order to buy or sell a tradeable object to an exchange. Preferably, the system intercepts the order and attempts to match it to one or more specific filters, which have been set by a trader or system administrator. The one or more filters may be based on a plurality of filter criteria such as dynamically computed trader's P/L levels. In one embodiment, a filter criterion may be based on a realized, net, or open P/L level, the embodiments of which will be described below. When a trader enters an order, and one of the trader's P/L levels matches one of the filters, a filter condition corresponding to that filter is applied to the order. The order can match one or more filters, and if there is a conflict between the filters, the most conservative condition may control. This preferred process may result in sending a modified order to the exchange, preventing the order from reaching the exchange, or sending the order to the exchange without any modifications, the embodiments of which will be described further below.

II. Hardware and Software Overview

Figure 1:
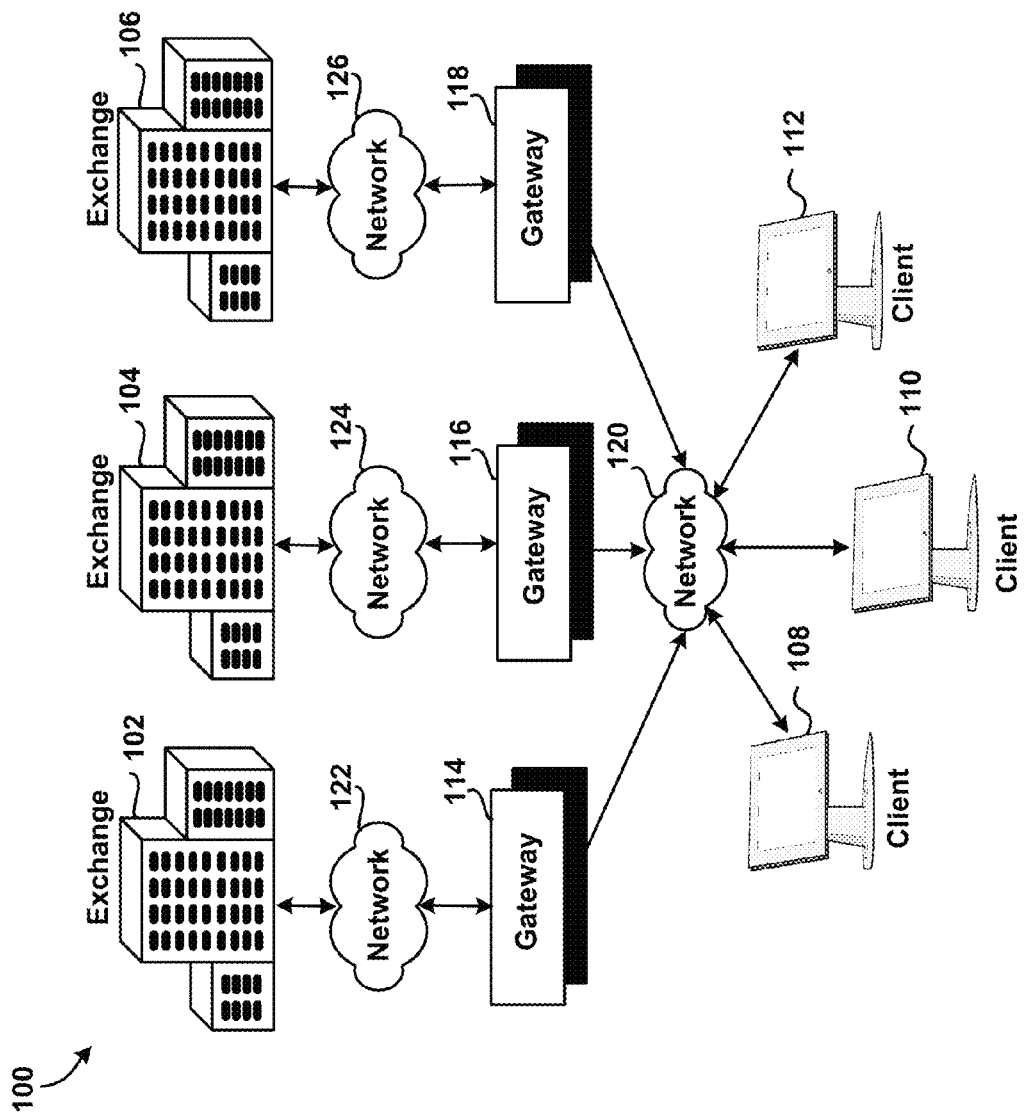
FIG. 1 is an example network configuration for a communication system utilized to access one or more exchanges.

FIG. 1 is a block diagram that illustrates an electronic trading system 100 in accordance with the preferred embodiments. The system 100 includes one or more exchanges 102, 104, 106 and one or more client devices 108, 110, 112. Intermediate devices such as gateways 114, 116, 118, routers, and other such types of client devices may be used to connect network 120 to networks 122, 124, 126 so that client devices 108, 110 and 112 and exchanges 102, 104, and 106 can communicate market information. It should be understood that the present invention is not limited to any particular system configuration. For example, networks 122, 124, and 126, or client devices 108, 110, 112 could connect separately to gateways 114, 116, 118. Of course, there are many other system configurations on which the preferred embodiments may be implemented.

A. Host Exchange

Host exchanges 102, 104, and 106 may represent electronic exchanges such as, for example, the London International Financial Futures and Options Exchange ("LIFFE"), the Chicago Board of Trade ("CBOT"), the New York Stock Exchange ("NYSE"), the Chicago Mercantile Exchange ("CME"), the German stock exchange—Exchange Electronic Trading ("Xetra"), or the European Exchange ("Eurex"), or any other exchange, which may include basic to more complex systems that automatically and electronically match incoming orders. These example exchanges and other exchanges are well known in the art. Communication protocols required for connectivity to one of these exchanges are also well known in the art.

Exchanges 102, 104, 106 allow traders to log onto a market to trade tradeable objects. As used herein, the term "tradeable objects," refers simply to anything that can be traded with a quantity and/or price. It includes, but is not limited to, all types of tradeable objects such as financial products, which can include, for example, stocks, options, bonds, futures, currency, and warrants, as well as funds, derivatives and metals. The tradeable object may be "real," such as products that are listed by an exchange for trading, or "synthetic," such as a combination of real products that is created by the user. A tradeable object could actually be a combination of other tradeable objects, such as a class of tradeable objects.

An exchange 102, 104, 106 can implement numerous types of order execution algorithms, and sometimes the type of algorithm depends on the tradeable object being traded. The preferred embodiments may be adapted by one skilled in the art of work with any particular order execution algorithm. Some example order execution algorithms include first-in-first-out and pro rata algorithms. The first-in-first-out (FIFO) algorithm, used for some markets listed with Eurex for example, gives priority to the first person to place an order. The pro rata algorithm, used for some markets listed with LIFFE for example, splits all orders for the same price. The present invention is not limited to any particular type of order execution algorithm.

Regardless of the type of order execution algorithm used, each exchange 102, 104, and 106 preferably provides similar types of information to subscribing devices 108, 110, and 112. Market information may include data that represents the inside market, which is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually provided by the host exchange in aggregate sums. In other words, the exchange usually provides the total buy quantity and the total sell quantity available in the market at a particular price level in its data feed. The extent of the market depth available to a trader usually depends on the exchange. For instance, some exchanges provide market depth for all (or most) price levels, while some provide only quantities associated with the inside market, and others may provide no market depth at all. Additionally, the exchanges 102, 104, 106 can offer other types of market information such as the last traded price (LTP), the last traded quantity (LTQ), and order fill information.

B. Gateway

Gateways 114, 116, 118 are devices such as a mainframe, superminicomputer, minicomputer workstation, microcomputer that connect network 120 to networks 122, 124, 126 so that market information can be successfully passed between client devices 108, 110, 112 and exchanges 102, 104, 106. Gateways 114, 116, 118 preferably receive market information from the exchanges 102, 104, and 106 and convert it to a format compatible with the protocols used by the client devices 108, 110, 112 using conversion techniques known in the art. Also, as known by those skilled in the art, gateways 114, 116, 118 may have one or more servers to support data feeds, such as a price server for processing price information, an order server for processing order information, and a fill server for processing fill information. A trader at one of the client devices 108, 110, 112 can subscribe to price information, order information, and fill information for a particular market hosted at the exchanges 102, 104, and 106. The gateways 114, 116, and 118 also preferably receive transaction information, such as orders, order changes, queries, etc., from the client devices 108, 110, and 112 and forward that information to corresponding exchanges 102, 104, and 106.

B. Client Device

The client devices 108, 110, and 112 are devices that provide an interface for traders to trade at one or more markets listed with one, some, or all of the exchanges 102, 104, and 106. Some examples of client devices include a personal computer, laptop computer, handheld computer, and so forth. The client devices 108, 110, and 112, according to one preferred embodiment, include at least a processor and memory. The processor and memory, both well known computer components, are not shown in FIG. 1 for sake of clarity. Preferably, the processor has enough processing power to handle and process various types of market information. It should be understood that more market information is received and processed, the more processing power is preferred. However, any present day processor has enough capability to perform at least the most basic part of the present invention.

Memory may include a computer readable medium. The term computer readable medium, as used herein, refers to any medium that participates in providing instructions to processor for execution. Such a medium may take many forms, including but not limited to, non-volatile media, and transmission media. Non-volatile media includes, for example, optical or magnetic disks, such as a storage device. Volatile media include dynamic memory, such as main memory or random access memory ("RAM"). Common forms of computer-readable media include, for example, a floppy disk, a flexible disk, a hard disk, a magnetic tape, or any other magnetic medium, a CD-ROM, any optical medium, punch cards, paper tape, any other physical medium with patterns of holes, a RAM, a PROM, and EPROM, a FLASH-EPROM, and any other memory chip or cartridge, or any other medium from which a computer can read.

The client devices 108, 110, and 112 receive market information from any of the exchanges 102, 104, and 106. According to the preferred embodiments, market information is displayed to the trader(s) on the visual output device or display device of the client devices 108, 110, and 112. The output device can be any type of display. For example, the display could be a CRT-based video display, an LCD-based or a gas plasma-based flat-panel display, a display that shows three-dimensional images, or some other display type. The present invention is not limited to any particular type of display.

Upon viewing the market information or a portion thereof, a trader may wish to send orders to an exchange, cancel orders in a market, query an exchange, and so on. To do so, the trader may input various commands or signals into the client devices 108, 110, and 112, for example, by typing into a keyboard, inputting commands through a mouse, or inputting commands or signals through some other input devices. Upon receiving one or more commands or signals, the client devices 108, 110, and 112 preferably generate transaction information. For instance, a trader may click a mouse button to initiate an order to buy a tradeable object. Then, transaction information would include an order to buy a particular quantity of the tradeable object at a particular price. There are many different types of messages and/or order types that can be submitted, all of which may be considered various types of transaction information. Once generated, transaction information is sent from the client devices 108, 110, and 112 to the host exchange 102, for example, over the networks 120, 122, 124, and 126.

III. Money Management and Profit-Related Information

Figure 2:
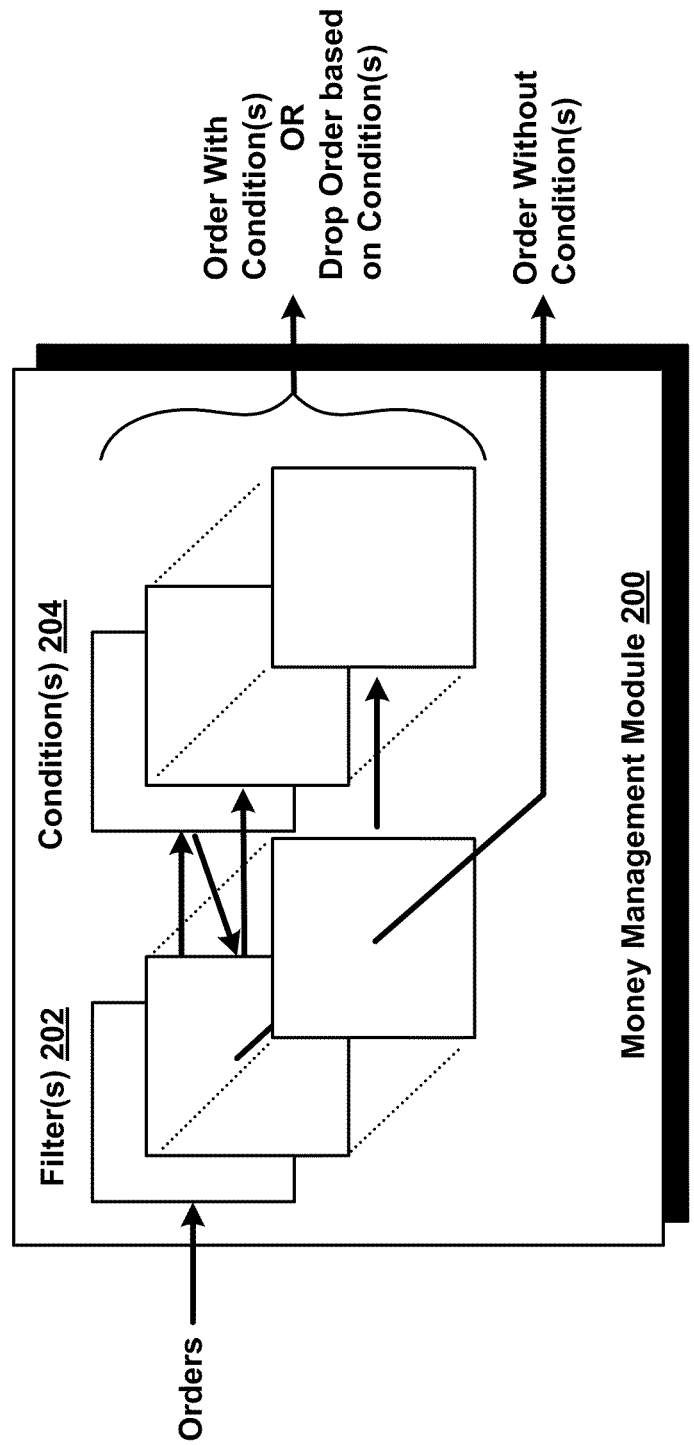
FIG. 2 is a block diagram illustrating an example money management module according to one embodiment.

FIG. 2 shows an example overview of the money management application 200, referred hereinafter interchangeably as a money management module. The money management module 200 may be implemented on any type of computing device. In the preferred embodiment, the money management module 200 is implemented on a client device. Alternatively, the money management module 200 may be implemented on any type of computing device such as a gateway, for example.

The money management module 200 preferably includes one or more filters 202. Each filter is made up of certain filter criteria that is preferably set by an individual, such as by a trader himself or by an administrator. For example, the filter criteria may include criteria that are based on the order itself, such as the name of an exchange, a tradeable object, a type of order, e.g., whether the order is a buy or a sell, a range of price levels, or a range of quantities. Additionally, the filter criteria may include criteria that are based on factors other than those related to the order, such as, for example, trader's profit and loss ("P/L") information, last traded price, last traded quantity, theoretical values, or other variables. In such an embodiment, the money management application 200 may determine filter criteria dynamically based on trader-related data or order data, e.g., order data being sent from a client device to an exchange, or based on order-related data that is received from the exchange in a data feed, data from any outside sources such as employment numbers or interest rates, or any data coming from an exchange such as price information, for example. Dynamic filter criteria may include a trader's net position, profit levels, a total working buy/sell quantity, a total filled buy/sell quantity, or any data that is received from the exchange or outside sources such as any news. Further, the filter criteria may be time-based so that time-based filters may be used in combination with another set of filter conditions. In such an embodiment, if more than one filter applies to the order, the most conservative filter conditions will control order parameters. Alternatively, the time-based filter may suppress other filters for the time period associated with the filter.

As will be described in greater detail below, filter criteria may be based on different types of P/L levels including an open, net, or realized P/L level. Further, for example, filter criteria may be based on any user-configurable equations that may include a plurality of user-configurable factors that are based on data available from an exchange or other sources. It should be understood that many other filter criteria are possible as well, and filter criteria may be user configurable.

According to an example embodiment, each filter is associated with one or more filter conditions that may be applied to an incoming order if the order matches the filter criteria. This process, as will be described in greater detail below, may result in sending a modified order to an exchange. For example, a certain condition associated with a filter, when applied to the order, may result in modifying one or more order parameters, such as increasing or decreasing order quantity. Alternatively, an application of a certain filter condition may result in preventing the order from reaching the exchange. Further, alternatively, a filter condition may result in sending the order to the exchange without modifying any of the order parameters.

It should be understood that the money management module 200 may enable a trader or a risk administrator to configure filters as well as any filter conditions for each filter via a graphical user interface, the embodiments of which will be discussed in greater detail below. In such an embodiment, the graphical user interface may provide a trader with a list of filters so that when a trader selects one of the filters from the list, a second graphical user interface may be displayed, via which the trader may define any desired filter conditions for that filter. Alternatively, a single interface may be used to enable a trader to select any desired filters and define filter conditions. Further, alternatively, a trader may define filters and/or filter conditions using a spreadsheet application that may be linked to the graphical user interface or money management module 200. In such an embodiment, for example, a filter condition may be in a format of an equation, and a trader may enter the equation or change any variables in the equation using the spreadsheet.

When a trader uses a spreadsheet, it should be understood that any desirable data exchange protocol could be used to embed information from the third party software to the money management module 200 or to the graphical user interface that is used to define filters and filter conditions. For example, when the Microsoft Windows is used as the third party software, Microsoft OLE 2.0 may be used to perform these functions. In such an embodiment, Microsoft OLE 2.0 may be used to provide a link between any filter condition and a cell from a Microsoft EXCEL spreadsheet. Data exchange protocols in general, and linking as well as embedding techniques in particular, are well known to those skilled in the art. It should be understood that when an equation is used to define a filter condition, every time a value of one of the equation variables changes, the spreadsheet application or any other third party software may dynamically calculate a new value for the filter condition associated with the equation. Thus, when an order matches a certain filter associated with such an equation, the money management module 200 may apply the most recently calculated filter conditions provided by the spreadsheet application, for example.

It should be understood that an individual trader can uniquely set filters and filter conditions to suit his or her individual trading risk strategies. In one embodiment, the trader could program the money management filters and conditions in a variety of ways and at any time such as before trading begins or on the fly. Alternatively, a system administrator who oversees a number of traders may set up a number of filters and filter conditions for a group of traders or for individual traders, thus creating a money management program that controls trades of the group of traders. Then, when a trader in that group inputs a new order, the money management module 200 can execute the program by applying the pre-configured filter criteria and filter conditions to the order.

Figure 3:
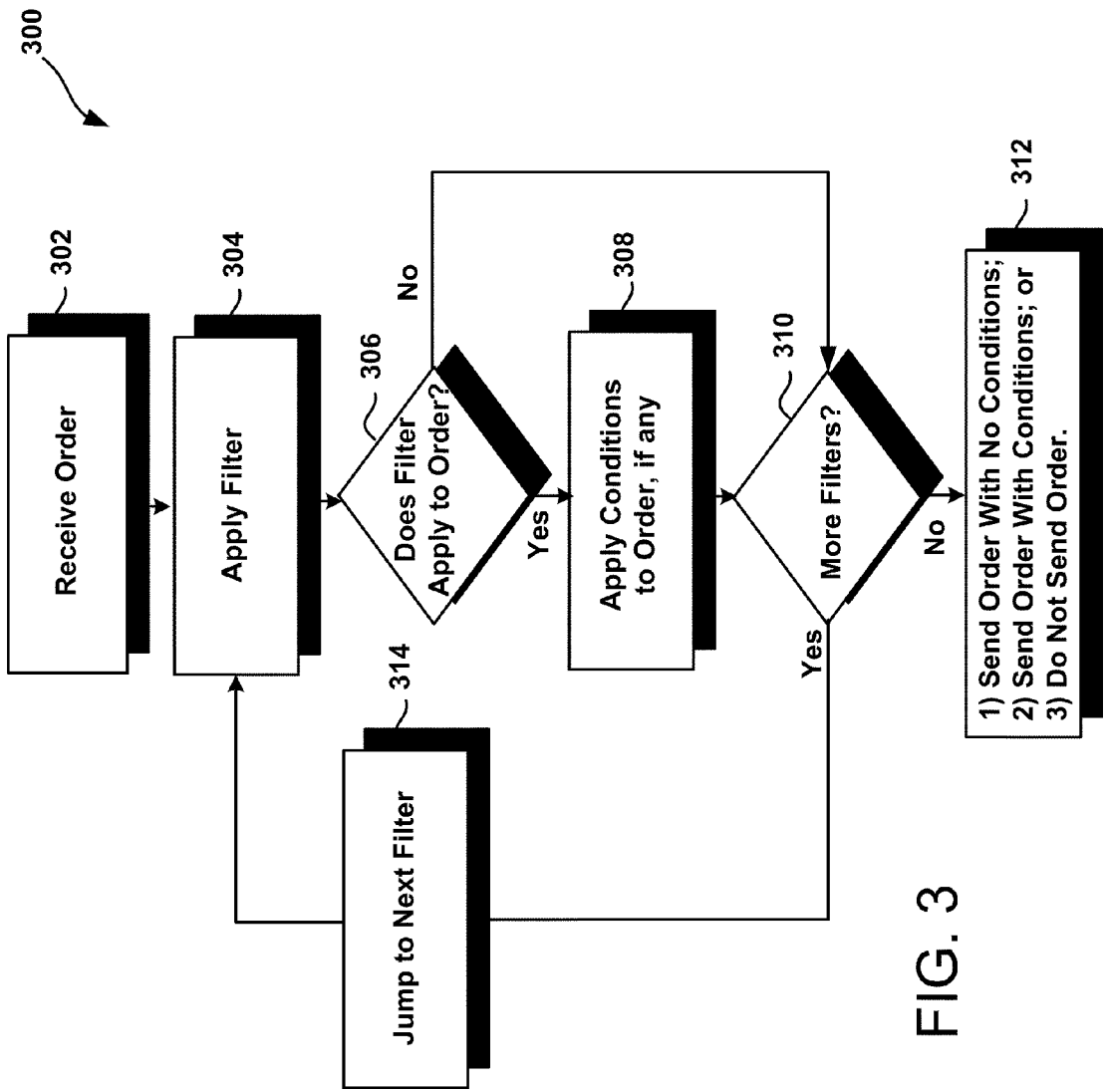
FIG. 3 is a flow chart illustrating an example method for money management in an electronic trading environment according to one embodiment.

FIG. 3 is a flow chart illustrating an example method 300 for money management in an electronic trading environment. According to an example embodiment, the money management module 200 may perform the method 300. The example method 300 includes receiving an order at step 302, applying a first filter at step 304, determining if the filter is applicable to the order at step 306, then, if the filter is applicable, applying conditions associated with the filter at step 308, and determining if there are any other filters to be applied to the order at step 310. If there are any other applicable filters, the method 300 includes retrieving the next filter at step 314, and then repeating steps 304, 306, 308, and 310 until there are no more filters that are applicable to the order. If there are no more filters, the method 300 includes, at step 312, processing the order based on the applied conditions.

At step 302, money management module 200 detects a new order being placed by a trader. It should be understood that a trader may input a new order using many different trading applications and interfaces. In one embodiment, a trader may use a commercially available trading application, X_TRADER® from Trading Technologies International, Inc. of Chicago, Ill., that allows the trader to trade in a system like the one shown in FIG. 1. X_TRADER® also provides an electronic trading interface, referred to as MD Trader™, in which working orders and/or bid and ask quantities are displayed in association with a static axis of prices. Portions of the X_TRADER® and the MD Trader™-style display are described in U.S. patent application Ser. No. 09/590,692, entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, and U.S. application Ser. No. 10/125,894, entitled "Trading Tools for Electronic Trading," filed on Apr. 19, 2002, the contents of which are incorporated herein by reference. Further, it should be understood that orders may be placed using any automatic trading application as well.

However, the preferred embodiments are not limited to any particular product that allows a trader to input orders and trade in the system like the one shown in FIG. 1. Further, it should be understood that the money management module 200 and a trading application may share commonly used information so that, for example, the money management module 200 may have access to any data provided via data feeds from an exchange, such as information related to any fills related to orders submitted by a particular trader, and also to any data entered by a trader via a trading application interface.

When the new order is detected, at step 304, the money management module 200 may access a set of pre-configured filters and then may apply a first filter to the order. It should be understood that a filter may include one or more filter criteria, such as, for example, a trader's identifier, a name of a predetermined tradable object, a type of the order, e.g., a buy or a sell, or any other trader-related filter criteria such as criteria related to trader's performance, for example. Then, at step 306, the money management module 200 determines if one or more criteria associated with the first filter apply to the received order. It should be understood that a filter may include one or more user configurable criteria. If a filter includes a plurality of filter criteria, the order preferably matches all identified filter criteria for the filter to be applicable.

If the filter applies to the order, at step 308, the money management module 200 applies one or more conditions associated with the filter to the order parameters. For example, the application of a filter condition to an order may result in decrementing or incrementing the quantity associated with the order when the order is submitted to the exchange. If the money management module 200 determines that the first filter does not apply to the order, the method 300 continues at step 310, and the money management module 200 determines if there are more filters to be applied to the order. If there are any other filters, at step 314, the money management module 200 selects a next filter from the list of filters, and the method 300 continues at steps 304, 306, 308, and 310.

It should be understood that if two or more filters are associated with the same condition imposing different restrictions, such as, for example, decreasing order quantities to two different values, the most conservative (the lowest) order quantity associated with the filter criteria could be used to modify the quantity in the original order. Alternatively, a trader or system administrator may configure filter conflict rules that may be used by the money management module 200 to determine which filter condition, if any, should be applied to the order.

Referring back to step 310, if there are no more filters applicable to the order, at step 312, the money management module 200 applies conditions imposed by the filter(s) to parameters associated with the order. Once the money management module 200 applies the filters to the incoming order, the order may be sent to the exchange. As illustrated in FIG. 3, at block 312, sending the order to the exchange may involve sending the original order with no conditions, e.g., the original order with its non-modified order parameters, or sending the original order with conditions, e.g., the original order having one or more of its order parameters modified based on the conditions of the applicable filter(s). Further, alternatively, the application of filter conditions may result in not sending the order to the exchange, e.g., effectively preventing the order from reaching the exchange. If the order is rejected because one of the money management filter conditions prevents the order from being sent to the exchange, a message may be displayed for a trader so that a trader is aware that the order was not sent to the exchange. Alternatively, a message may also be displayed to inform a trader of any order modifications such as order quantity modifications, for example.

Figure 11:
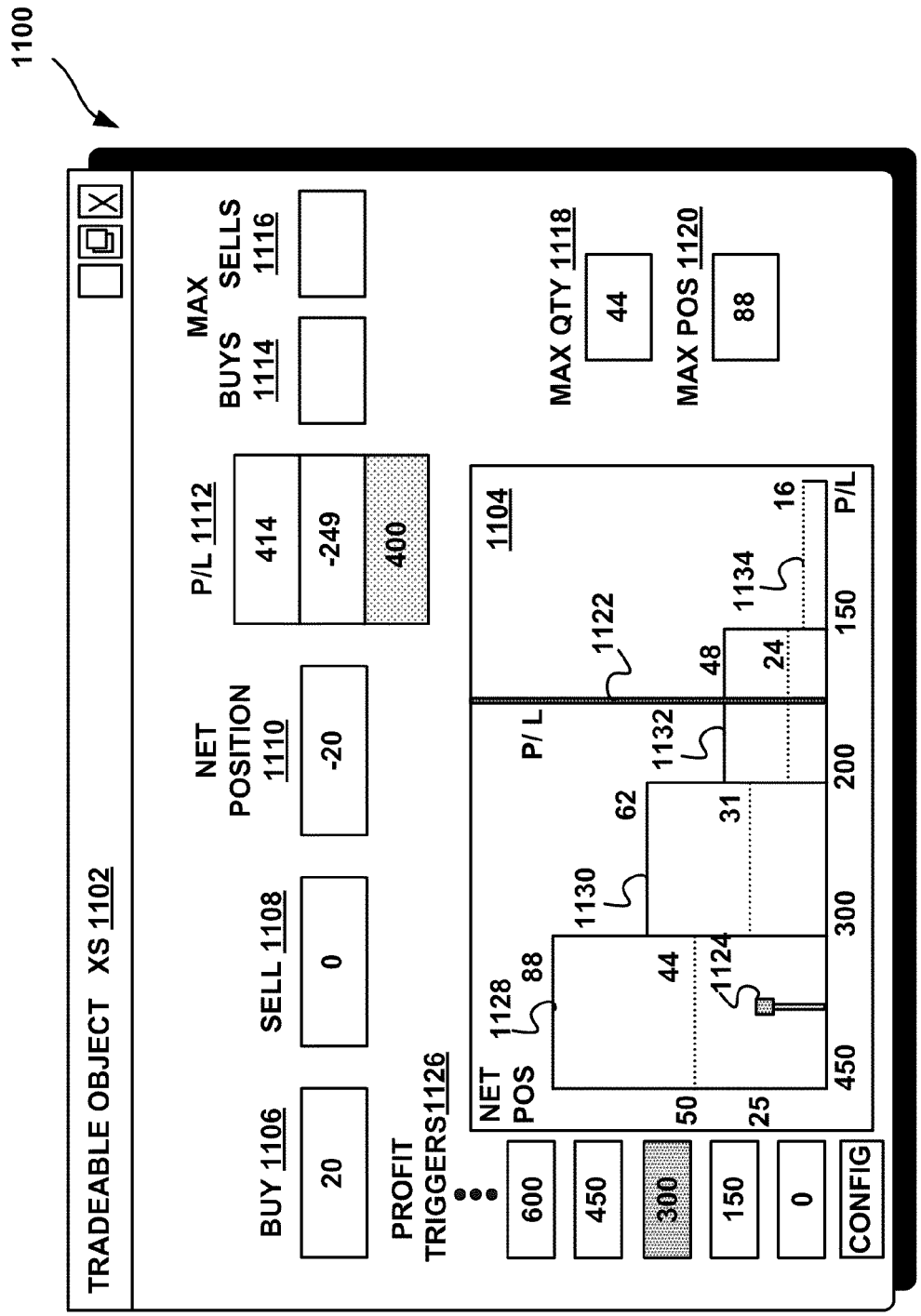
FIG. 11 is a block diagram illustrating an example graphical interface for displaying trader related P/L information and money management filter related data.
Figure 12:
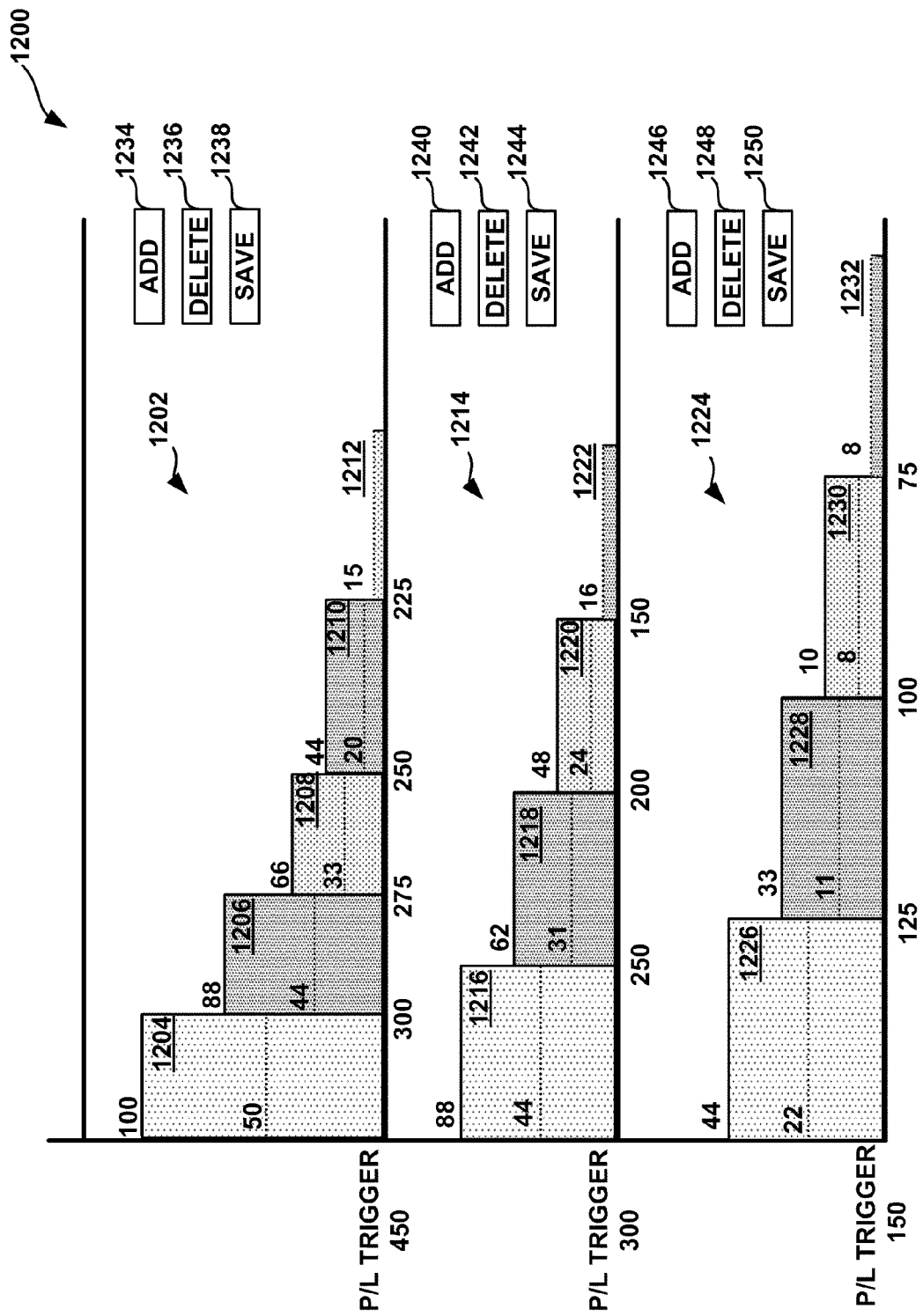
FIG. 12 is a block diagram illustrating an example graphical interface using which a trader can configure a plurality of filters for each P/L trigger level.
Figure 13:
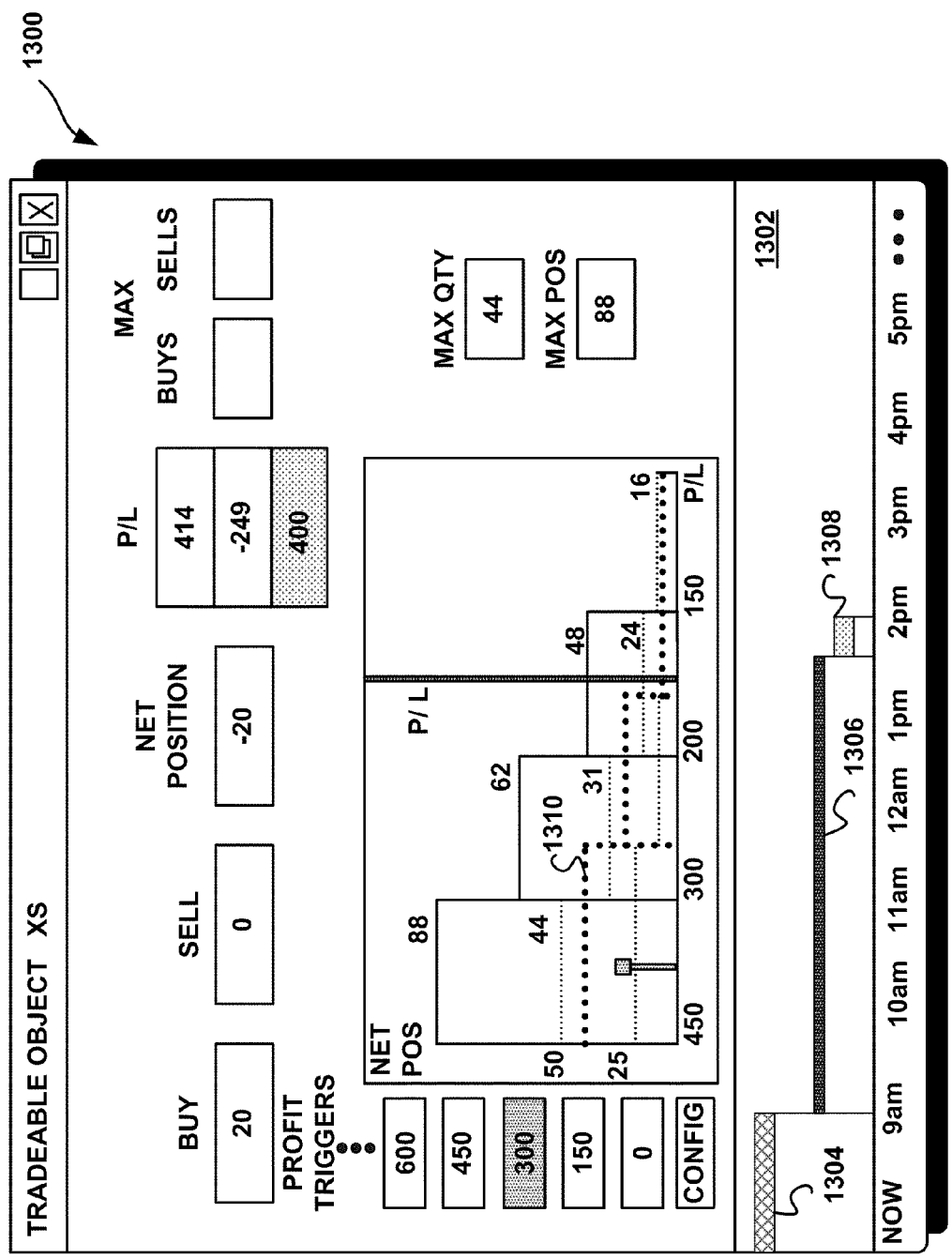
FIG. 13 is a block diagram illustrating an example graphical interface for displaying a money management filter band in combination with P/L indicators and time-based filter indicators.
Figure 14:
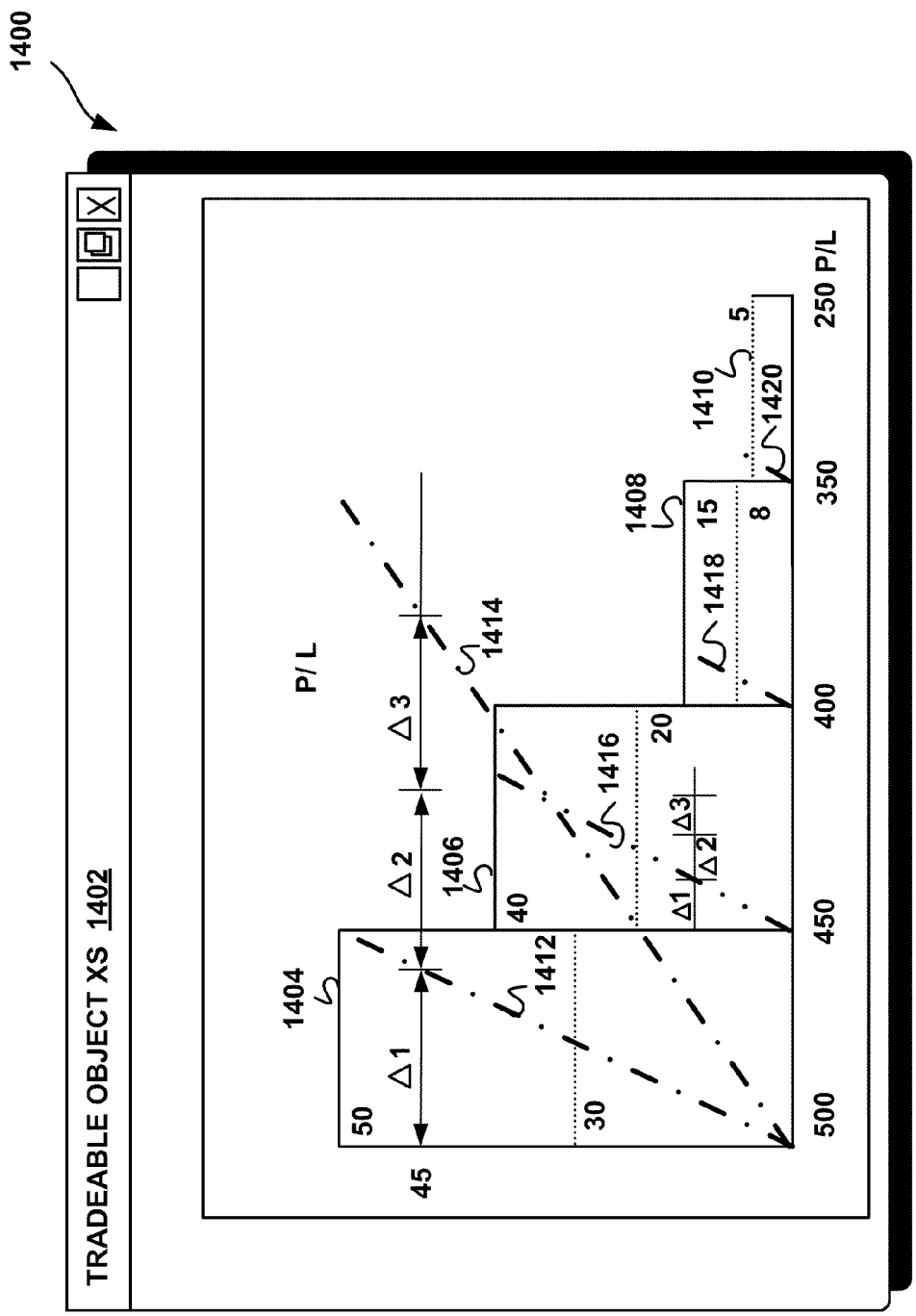
FIG. 14 is a block diagram illustrating an example graphical interface that may be used for verifying and changing filter conditions configured by a trader or a system administrator based on a plurality of drop off loss conditions.
Figure 15:
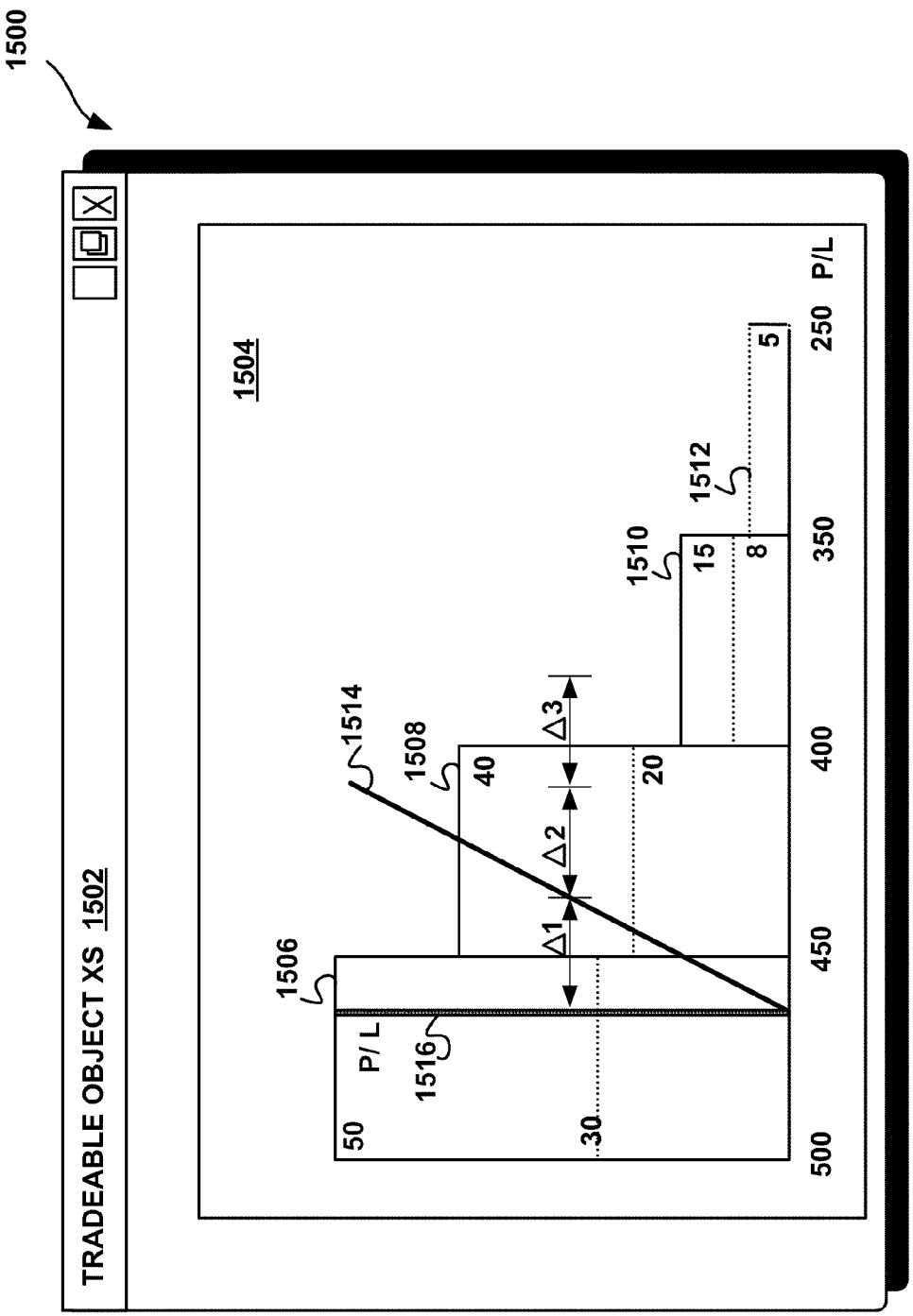
FIG. 15 is a block diagram illustrating an example interface that displays potential profit drop off indicators in relation to a trader's realized profit indicator.

In addition to its money management functionality, the money management module 200 may also determine and display to a trader via one or more graphical interfaces, in combination with or separately from the money management filters, one or more P/L level indicators that may allow a trader to view his/her profit information at any time during a trading day and that may assist a trader in making profitable trades. The next few figures, FIGS. 4, 5, 6, 7 and 8 illustrate example graphical interfaces that display profit related indicators associated with a plurality of profit levels. Then, FIGS. 9, 10 and 12 illustrate example graphical interfaces that enable a trader to configure and view filters and filter conditions that may be used for automatic money management. FIGS. 11 and 13 displays an example graphical interface that may be used to display money management filters and profit indicators. Then, FIGS. 14 and 15 are example graphical interfaces that display potential loss drop-off indicators that may be used to verify filter configurations and to assist a trader in making new trades and his/her trading strategy. However, it should be understood that the graphical representations of profit related information as well as filters and filter conditions given below are only examples, and those skilled in the art will recognize that modification or changes within the scope of the present invention may be made without departing from the spirit thereof. Also, it should be understood that the present invention is not limited to the number of filters or filter conditions presented in each figure, nor is it limited to the example layouts, and the money management interface as well as profit indicators may be configured in a variety of different ways based on user preferences.

As will be illustrated in reference to the subsequent figures, a graphical interface may display to a trader a plurality of P/L indicators that may assist a trader in making profitable trades as well as allow a trader to view his current as well as potential P/L levels at any time during a trading day. More specifically, the P/L indicators include indicators corresponding to realized, net, and open P/L levels, the methods of calculating each of them will be described hereinafter.

The realized P/L level is based on a difference between the total sell price and the total buy price associated with trader's trades related to a tradeable object. Therefore, the realized P/L level may be calculated using the following formula:

$$\text{Realized } P/L = \text{Sells} - \text{Buys} \qquad \text{EQN (1)}$$

In one embodiment, the Realized P/L is calculated when the trader's net position is zero such as, for example, when a trader buys 30 lots first and then sells 30 lots. Alternatively, the Realized P/L could be determined when a trader's net position crosses zero. In such an embodiment, for example, when a trader initially buys 30 lots at 100, and then sells 50 lots at 101, the Realized P/L may be determined based on 30 buys at 100 and 30 sells at 101, leaving the net position of 20. Further, alternatively, the Realized P/L may be determined by mapping each new fill to one of the quantities associated with the net position. For example, if the net position is 30, and a new fill of 2 associated with a sell order is detected, the quantity of 2 may be matched with one of the buy order quantities that got filled to establish the net position of 30, thus creating a new net position of 28. It should be understood that matching of the orders may be done in any manner. For example, if a trader entered a plurality of buy orders to establish the position of 30, the sell order quantity may be matched with a buy order quantity and price associated with the first buy order. Alternatively, the sell quantity may be matched with a buy order quantity and price associated with the last buy order that was entered to create the net position of 30. Further, alternatively, an average buy price may be calculated for all buy orders, and the average price of all orders may be used as a basis for determining the Realized P/L. It should be understood that a user could also define how and when the Realized P/L is calculated. According to an example embodiment, the Realized P/L level may be dynamically updated based on market updates being received from one or more exchanges so that the Realized P/L level may be updated every time one of the conditions described above is detected.

Next, the net profit level may be determined when the trader's net position is non-zero, such as when the trader holds a position on the market. Therefore, the net profit level is determined based on the trader's net position and the current market conditions, such as the last traded price being received from the exchange. Preferably, the net position is calculated based on the buy and sell orders that have been filled excluding working orders, which may be used for risk analysis, as will be described below. It should be understood that when the trader's net position or the last traded price changes, the net P/L level is dynamically recalculated to reflect each change.

The net profit level may be calculated using the following formula:

$$\text{Net } P/L = (\text{Sells} - \text{Buys}) + (\text{Net Position} \times \text{Market Price}) \quad \text{EQN(2)}$$

Referring to EQN(2), the first factor "(Sells−Buys)" corresponds to the cost of every buy and sell that a trader has made, and the second factor "(Net Position×Market Price)" is an adjustment factor as if the trader was to trade out of his open positions in the current market, such as based on the last traded price corresponding to a predetermined tradeable object. Therefore, using the net P/L, the trader can easily determine the profit or loss that the trader would incur if he/she were to close the pending positions at the last traded price. Therefore, referring to the example given above of the 30 buys at 100, and then 50 sells at 101, and using EQN(2), the Net P/L would be 30, i.e., (5050−3000)+(−20×101)=2050−2020, which is 30. It should be understood, however, that other prices other than the last traded price could also be used to reflect the current market conditions. For example, a bid/ask price at the inside market could be used in place of the last traded price so that when a trader's net position is negative, the bid price at the inside market is used, and when a trader's position is positive, the ask price at the inside market is used instead. It should be understood that different or equivalent prices could also be used.

The Net P/L may be used as a factor in any other equations to calculate different types of P/Ls. For example, the Open P/L could be calculated by subtracting the Realized P/L from the Net P/L. The Open P/L level may be calculated using the following formula:

$$\text{Open } P/L = \text{Net } P/L - \text{Realized } P/L \quad \text{EQN (3)}$$

Using the Open P/L, the trader can easily view the risk that the trader is taking by keeping his positions opened at the current market level. Referring to the example above, at the time when the trader initially gets into the position of −20 by selling 50 contracts at 101 while having the open position of 30 that he/she entered at 100, the Open P/L is zero as there has been no market movement since the trader entered into the position of −20, i.e., sold 50 lots at 101. However, once the market moves and reaches the last traded price of 100, for example, the market move is favorable to the trader since the trader has the open position of −20 that he entered by selling at 101. Therefore, the Net P/L is 50 [(5050−3000)+(−20×100)], and the Open P/L is 20 (50−30), indicating that the trader is making money in the current market, and would realize the P/L of 50 if he were to close at the current market level of 100, causing the Net P/L value to be added to the Realized P/L. It should be understood that the formulas in EQNs (1) and (2) are only examples, and different formulas could also be used. For example, any market fees and transaction costs can be subtracted from the Realized P/L in EQN (1).

Figure 4:
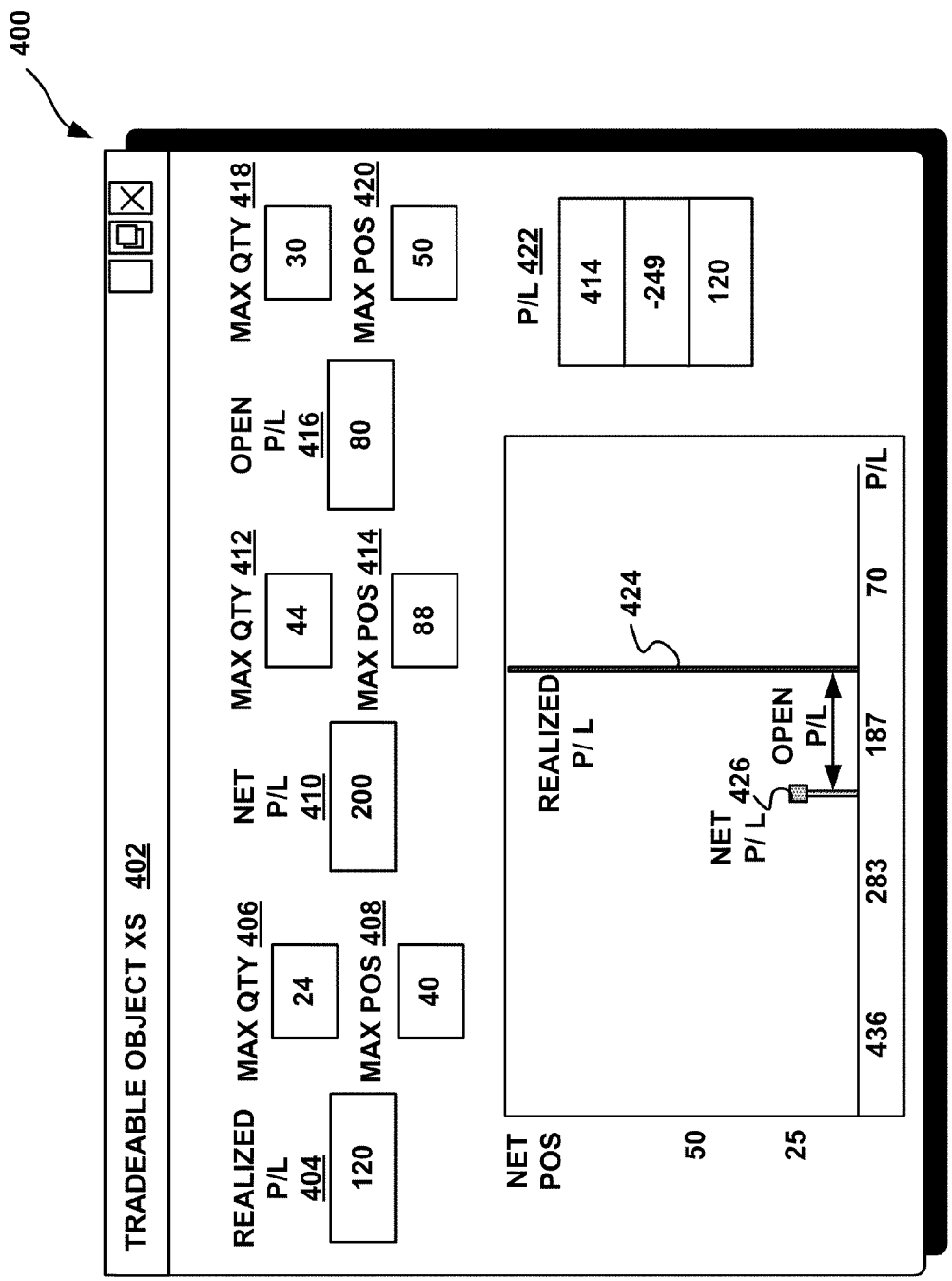
FIG. 4 is a block diagram illustrating an example graphical interface for displaying profit/loss ("P/L") information related to a tradeable object.

FIG. 4 is a block diagram illustrating an example graphical interface 400 for displaying P/L information related to a tradeable object being traded by a trader at one or more electronic exchanges.

As illustrated in FIG. 4, the interface 400 displays a number of graphical and numerical indicators corresponding to the Realized P/L and Net P/L levels. More specifically, graphical indicators 424 and 426 correspond to the Realized and Net P/Ls, respectively, and the numerical indicators 404, 410 display actual values (120, 200) corresponding to the two P/L levels. It should be understood that the distance between the net and realized indicators corresponds to the Open P/L. Thus, in the embodiment illustrated in FIG. 4, where the P/L scale (x-axis) increases to the left, the Open P/L is positive and indicates that the trader is making money in the current market. It should be understood that the x-axis could also display values increasing from left to right as well. More specifically, as illustrated in the indicator 416, the Open P/L is 80. Additionally, the height of the Net P/L indicator may correspond to the trader's Net Position. In the embodiment illustrated in FIG. 4, the quantity scale, that in this and following examples is used to display the Net Position, is displayed on the y-axis of the graphical indicator window, and the height of the indicator 426 corresponds to the net position of 25. However, instead of displaying the net position in relation to the quantity axis, a numerical value corresponding to the net position could be displayed in relation to the indicator 426.

It should be understood that the indicator 426 is preferably color-coded to distinguish a long (positive) position from a short (negative) net position. For example, red and blue could be used where the red indicator would correspond to the short position, and the blue indicator corresponds to the long position. However, different colors could also be applied to the indicator. Additionally, it should be understood that the graphical display could be configured in any manner so that the values on the x-axis, for example, in this Figure as well as subsequent Figures could increase in a traditional manner to the right rather than to the left. Further, the axis could be displayed in any manner as well, such as at angles that can be user configurable.

Additionally, as will be explained in greater detail below, each graphical profit indicator may be mapped to and displayed in one of a plurality of money management regions that correspond to a plurality of money management filters. As mentioned in earlier paragraphs, a money management filter is defined using one or more filter criteria and is associated with a set of parameters that control trader's trading. According to one example embodiment, a filter criterion corresponds to a predetermined profit range, and the controlling parameters may define a maximum order quantity that a trader may submit with any order, and a maximum net position that the trader may hold based on the trader's profit level. Further, it should be understood that a trader or a system administrator may configure which of the P/L levels controls selection of the filters. Thus, for example, if a trader places an order that has an order quantity higher than a maximum order quantity defined by the filter associated with the trader's Net or Open P/L level, then, before the order is sent to the exchange, the order quantity is modified to the value associated with the maximum order quantity defined by the filter. It should be understood that the Net P/L level, Open P/L level, the Realized P/L level, or a combination thereof may determine the filter selection for the money management purposes, and the maximum order quantity as well as the maximum net position may be determined using an equation defined for each filter so that more than one order quantity can be associated with each filter.

Using the Open or Net P/L level as a filter criterion, the money management module may guard and limit trader's losses if the market moves in a direction that is not favorable to a trader. Then, the change in the trader's Open and Net P/Ls, which dynamically change based on the market movement, may consequently move the trader to the lower/higher filter associated with a higher/lower maximum order quantity and maximum net position. Therefore, when the market moves against the trader's position, the trader will be allowed to trade lower order quantities as compared to order quantities that a trader may trade if the market moves in a direction favorable to a trader. Additionally, when the market moves against the trader's position, the money management module may prevent the trader from further increasing his net position by preventing another order that would increase the trader's net position from being sent to the exchange.

It should be understood that when a system administrator sets up a number of money management filters for one or more traders, each trader may also create his own set of filters. The trader-created filters may be based on the same or different filter criteria and associated filter conditions as the filters created by the administrator. In such an embodiment, the money management module may apply two sets of filters to an incoming order, and if two or more applicable filters conflict, the most conservative filter condition may be selected to control the orders being sent to the exchange. This embodiment may be especially useful when a trader is willing to risk less than what he is allowed to based on the filters that have been set up by the system administrator.

As mentioned in earlier paragraphs, the filter conditions may include a maximum order quantity and a maximum net position. Referring back to FIG. 4, according to one example embodiment, in addition to displaying P/L graphical indicators, the graphical interface 400 may also display filter conditions determined for each P/L level. As shown in FIG. 4, the trader's Realized P/L 404 corresponds to a money management filter associated with a maximum order quantity 406 of 24 and a maximum net position 408 of 40. Further, as shown in FIG. 4, the Net P/L 410 corresponds to a different money management filter associated with a maximum order quantity 412 of 44 and a maximum net position 414 of 88. Then, the Open P/L 416 is associated with the filter conditions including a maximum order quantity 418 of 30, and a maximum net position 420 of 50.

The graphical interface 400 may also display numerical profit levels including the trader's maximum, minimum, and current realized profit levels of 414, −249, and 120, as shown at 422. It should be understood that the P/L levels do not necessarily have to reflect the P/L levels determined for the entire trading day interval. Alternatively, a trader may select a shorter time interval, such as the last hour, for which the maximum, minimum, and current realized P/L levels may be determined, and the values of which may be dynamically displayed via the graphical interface. Additionally, it should be understood that the graphical interface 400 may also display numerical values for maximum, minimum, and current profit levels related to other P/L levels, such as the Net P/L and/or Open P/L levels.

According to an example embodiment, positions of profit indicators on the graphical interface may be dynamically updated every time a new P/L level is recalculated based on market condition changes, such as last traded price changes, or based on changes in the trader's net position. Preferably, the re-calculation is done dynamically based on information being provided from the exchange, and every time a new net position or last traded price is detected, the P/L levels are recalculated. Once the P/Ls are recalculated, the respective P/L indicators, the Net and Open P/L indicators in this example, may be repositioned to the new level to reflect the change. Similar updates may occur when a changed in the trader's net position is detected.

It should be understood that the example embodiments for displaying trader's profit related information are not limited to the display illustrated in FIG. 4. For example, if a trader simultaneously trades a plurality of tradeable objects, the graphical interface could be divided into a plurality of windows or areas, and each window may display graphical and/or numerical profit level indicators associated with one of the plurality of tradeable objects being traded by the trader.

Further, in addition to calculating P/L levels for each tradeable object, the P/L levels could be determined for all or a selected group of tradeable objects being traded by the trader at one or more exchanges. In such an embodiment, the trader may view, in addition to or instead of P/L levels determined for a specific tradeable object, his/her overall and dynamically updated P/L levels. However, if the tradeable objects are being traded at different denominations, the money management module or the trading application may convert the P/L levels corresponding to each tradeable object to the common tick or currency value that is then used to calculate a cumulative P/L level. Further, alternatively, once a trader or a system administrator selects which of the P/L levels controls the money management filter selection, the graphical interface may display only filter conditions, e.g., the maximum order quantity and the maximum net position, corresponding to that filter.

Alternatively, instead of displaying indicators associated with P/L levels determined throughout the trading day, a trader could instead reset P/L levels to a zero level at any time during a trading day. In such an embodiment, the displayed P/L level is based on a P/L calculated from the zero level starting from the time when a resetting input was detected. The resetting input may be received via many means including, for example, any graphical selection input, or any key-combination input. In one example embodiment, once the reset input is detected, only the reset P/Ls are displayed, and a trader may switch back to the cumulative P/L by selecting the same resetting selection input. Alternatively, when the trader selects the reset input, the cumulative and reset P/L values may be displayed using different indicators. Further, as will be described below, since the P/L values control the filter selection, once the P/L is reset, the most conservative filter may control the trader's trading since the trader starts trading from the zero P/L level. Alternatively, the cumulative P/L may still control filter selection, while the graphical interface displays the reset P/L levels. Further, a trader may select which of the P/L levels is reset. For example, a trader may reset only the Realized P/L or only a Net P/L.

It should be understood that the graphical indicators that are used to display P/L levels are not limited to any specific format, and the indicators could have any format and could be user-configurable. For example, the open, realized, and net P/L indicators may be distinguished using different colors or different indicator types. The indicators could also be displayed in any manner, such as horizontally, vertically, or at any angle, and in association with any trader-related or market-related information.

In addition to displaying profit level indicators, the graphical user interface 400 could also be used for sending orders to one or more electronic exchange. For example, the net P/L indicator 426 may be associated with an order-sending component for receiving a command to send an order to an electronic exchange as a result of a selection of an area in relation to the indicator 426 and detecting a predetermined key combination input. Alternatively, a graphical selection order input indicator could be displayed in relation to the indicators via the graphical user interface 400 so that once the graphical selection order input indicator is enabled, a trader may simply select an area in relation to the indicator 426 to send the order to the exchange. In a preferred embodiment, an order may be sent to the exchange upon selecting the indicator 426, and an order quantity may be based on a trader's net position and may be set to a quantity lower than, higher than, or equal to the trader's net position. Then, the price of the order may be determined based on a current net P/L, so that the price of the order may be based on a current market level. Alternatively, another P/L level in association with the indicator 426 may be selected, and the price of the order may be determined based on the selected P/L level and based on the price level associated with orders associated with the net position level.

In addition to displaying current Open and Net P/L levels, the graphical interface may also display one or more profit levels that are based on potential future market movements. For example, the graphical interface may display profit levels that are based on potential market movements when the market goes against the trader's position, thus, providing to a trader a graphical representation of potential risk.

Figure 5:
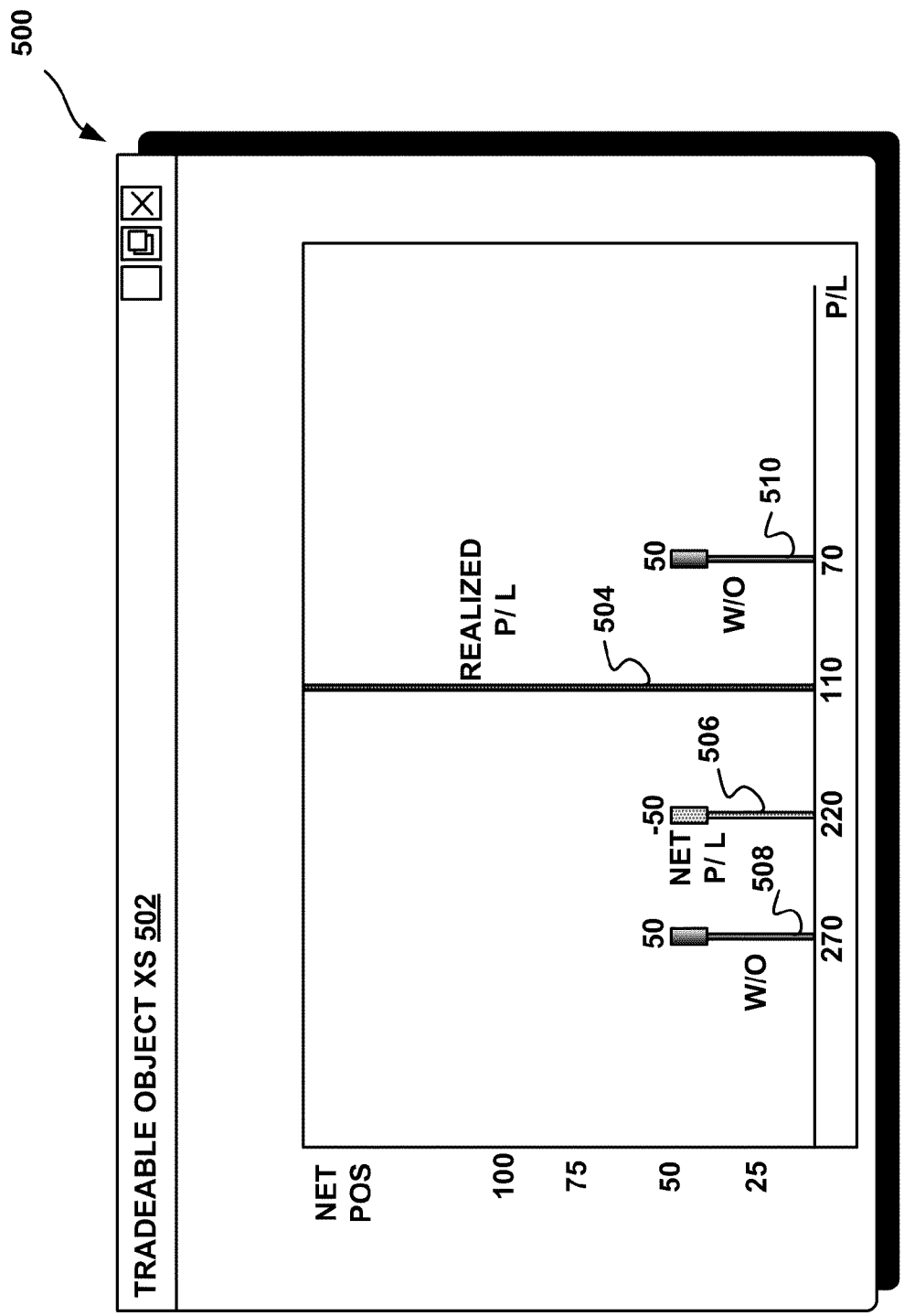
FIG. 5 is a block diagram illustrating an example graphical interface for displaying P/L indicators for working orders associated with a tradeable object.

FIG. 5 is a block diagram illustrating a graphical interface 500 for displaying a plurality of profit level indicators including the indicators associated with working orders that a trader may place on the market to completely trade-out of his net position.

The graphical interface 500 displays profit related indicators determined for the tradeable object XS 502, and includes a realized profit indicator 504 at the P/L of 110, a net profit indicator 506 at the P/L of 220, and two additional profit indicators 508 and 510 determined based on two working orders that a trader has placed in the market to offset his current net position of −50. For example, the indicator 508 may be associated with a working buy order having a predetermined order quantity equal to the current net position, placed at the price level of (LTP−X), where X corresponds to a number of ticks away from the current LTP. Thus, the profit level associated with the indicator 508 illustrates a Realized P/L if the working order gets filled. Then, the indicator 510 may correspond to a stop/limit order that a trader has placed on the market at a price level higher than the last traded price (LTP+X) to minimize his losses in case his working order associated with the indicator 508 does not get filled and the market moves against his position.

It should be understood that the method of calculating the profit level corresponding to the stop working order may vary based on system configurations that are used for placing the stop orders. For example, "X" may correspond to the price that triggers placement of the order on the market, and then the price where the actual order is placed on the market may vary based on the order configuration. For example, once a trigger price (stop price) is detected, the order may turn into another order, the type of which may depend on the trader's configuration. For example, the actual order may be a limit order configured at a limit price that may be set to the stop price plus/minus an offset. The offset parameter may be statically set by a trader, or may be dynamically determined based on how fast the market moves, and in what direction the market moves at the time when the trigger price is detected. For example, a positive or negative offset may be added to X to increase the chances of the order getting filled. If such an offset is used, the money management module or the trading application may consider the offset in calculating the profit level associated with the working order. Alternatively, an offset of zero could be used so that when the market reaches the stop price, the order is placed at the stop price. Those skilled in the art will realize that many different variations are possible as well. For example, instead of placing a limit order, a market order could be used instead so that once the stop price is detected, the order is placed at the market price so that in the fast moving market, the price at which the order is placed on the market may be a few ticks away from the stop price. In an embodiment when the order is defined as a market order, the working order indicator may display the profit level as if the order was to get filled at the stop price rather than any other price.

Figure 6:
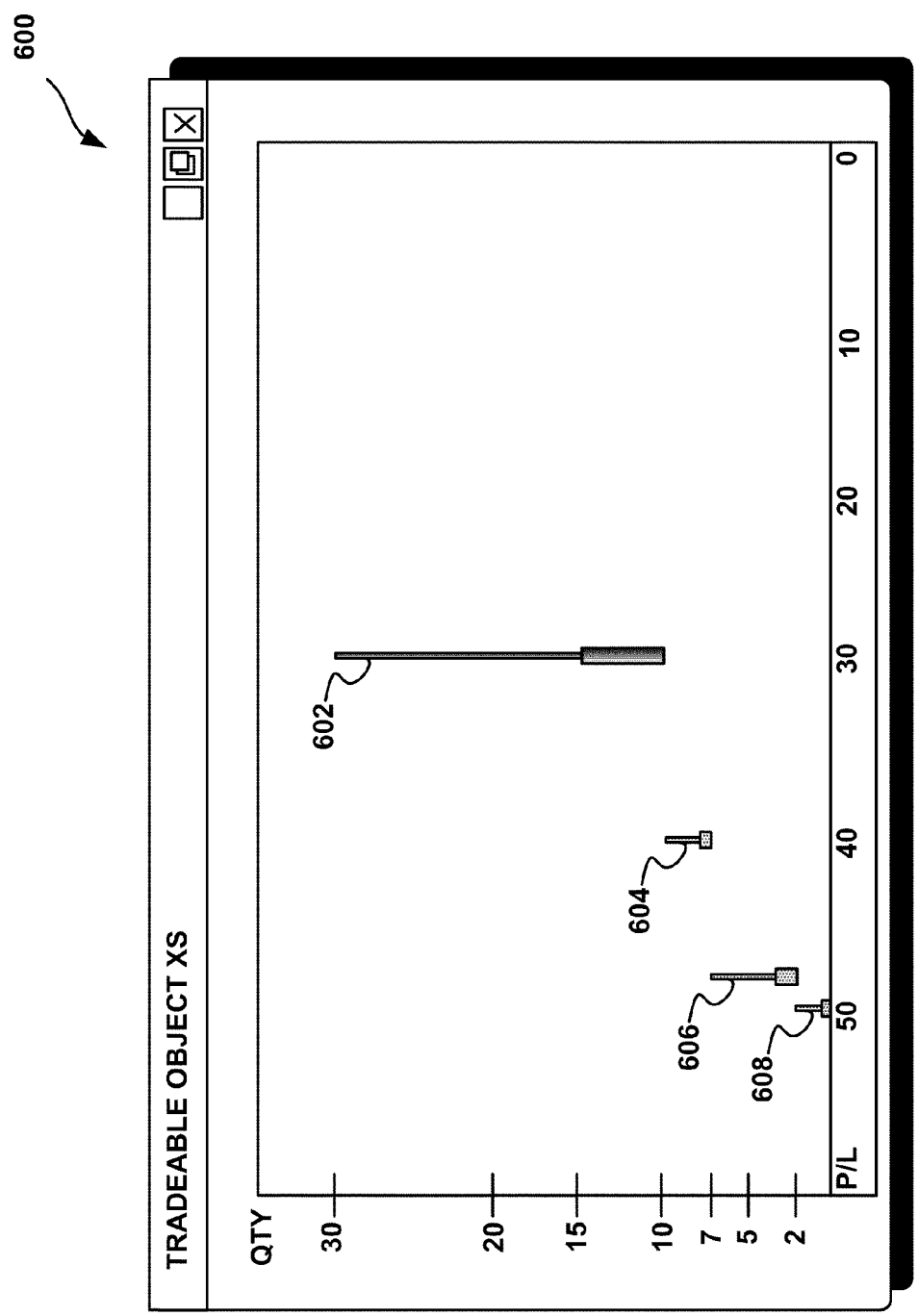
FIG. 6 is a block diagram illustrating an example graphical interface for displaying P/L levels for a plurality of working orders that a trader may enter to exit the trader's position.

FIG. 6 is a block diagram illustrating a graphical interface 600 for displaying Net P/L levels for a plurality of working orders that a trader may enter to get out of the trader's position.

In FIG. 6, let's assume that a trader's buy order having an order quantity of 30 gets filled at the price of 100 so that the trader's net position is now 30. Let's then assume that before or after the first order gets filled, the trader places four sell orders to offset his current net position of 30. For example, the four sell orders include a first order having an order quantity of 20 at the price of 101 (20@101), a second order of 3@102, a third order of 5@103, and a fourth order of 2@104.

Referring to FIG. 6, the x-axis corresponds to the total P/L associated with working orders, and the y-axis corresponds to the quantity. Additionally, each working order is depicted using an indicator, the length of which corresponds to the order quantity of each working order. Also, according to an example embodiment, since the working orders are entered to offset the net position, the first working order is displayed at the quantity level corresponding to the net position. For example, even if only one working order has the order quantity lower than the net position, the top of such a working order indicator will be displayed at the level of the net position, and the length of the indicator will correspond to the working order quantity. Therefore, for example, an indicator 602 corresponds to the first working order, where the top of the indicator is displayed at the level of the net position of 30, and the length of the indicator corresponds to the quantity associated with the first order.

Additionally, each working order indicator is displayed in relation to the P/L level. The indicator 602 is plotted at the P/L level of 30 since the first working order corresponds to a price that is one tick higher than the originally filled order, and one tick movement based on the total working order quantity of 30 corresponds to the profit tick movement of 30. Then, assuming that the first working order gets filled, the total working order quantity would decrease to 10, and each one tick P/L movement would cause the P/L to move by 10 ticks, respectively. Therefore, the indicator 604 corresponding to the second order is plotted at the total quantity level of 10 and the P/L of 40, where the length of the indictor corresponds to the order quantity of 3. The indicators 606 and 608 are plotted using the same method and correspond to the third, and fourth orders. Therefore, if all working orders were to get filled, the trader would realize the P/L of 49.

In the embodiment illustrated in FIG. 6, the order in which the indicators are illustrated corresponds to their prices since if the market sweeps through the working orders, the first order will get filled before the second order, and the second order will get filled before the third order, etc. It should be understood, however, that if the order quantity corresponding to the working orders is higher than the filled quantity of 30, in this example, the remaining quantity represents the start of the next net position and may be graphically displayed in relation to the fourth working order indicator 610. For example, a graphical indicator with a number corresponding to the remaining working quantity could be displayed.

Additionally, it should be understood that a trader could modify, delete, or add working orders using the graphical interface 600. Each working order may be associated with an order sending component such as the one described in relation to the net P/L indicator in FIG. 4. For example, a trader could modify a working order quantity of each working order by simply clicking on each working order indicator. In such an embodiment, a selection of the indicator may enable a display of a window, via which a trader can change the order quantity and the order price. Alternatively, a trader could simply drag the length of the indicator to modify the quantity associated with the order and also drag the indicator to a desired P/L level location. A trader could also delete a working order by simply selecting the working order indicator and then entering a delete selection input, which may include a graphical identifier or any key combination input.

A trader could also enter new working orders using the methods described in reference to FIG. 4, where instead of selecting an area in relation to the net P/L indicator, the trader could select the area in relation to one or more working orders. For example, referring to the example given above, if a trader has a first working order having the order quantity of 20 at 101, and the second order having the order quantity of 10 at 103, a trader may input another working order between the two orders by entering a predetermined selection input, such as entering a predetermined key combination, or a mouse input, and then inputting an order quantity via a pop-up window. It should be understood that once the order is entered, the P/L level at which the order is entered may be used to determine a price level at which to enter the order. The price could be determined by reversing the method that was used to determine P/L levels for the working orders. Therefore, the price level for a working order may be determined relative to the price of the filled order, i.e., 100 in this example.

In one embodiment, once a new working order is entered, and the total working order quantity is higher than the quantity associated with the original fill, i.e., 30 in this example, the order quantity of the original second order may be modified to 5 so that the sum of the quantities is still equal to 30. Alternatively, the order quantity of the original second order may remain the same, so that when all working orders are filled, the trader will end up with a net position of −5, since the working order is this examples are sell working orders. Therefore, a trader may input working orders when a fill quantity is detected for another order so that the working orders are used to exit the net position.

Additionally, a working order trade-out mechanism may be provided so that when a predetermined selection input is detected, and then a trader selects one of the working order indicators, for example, the order quantity corresponding to that order could change to a quantity that is required to get out of the net position. The predetermined selection input can correspond to a graphical indicator, a key combination input, or any other input means. For example, if the trader enables the automatic working order trade-out, the trader can select the indicator 604, which would then cause the working order quantity of 3 to be changed to the working order quantity of 10. The working order trade-out mechanism may then cause the third and fourth orders to be deleted. Alternatively, the third and fourth order may remain on the market, but the fill of the orders would result in a non-zero net position.

Figure 7:
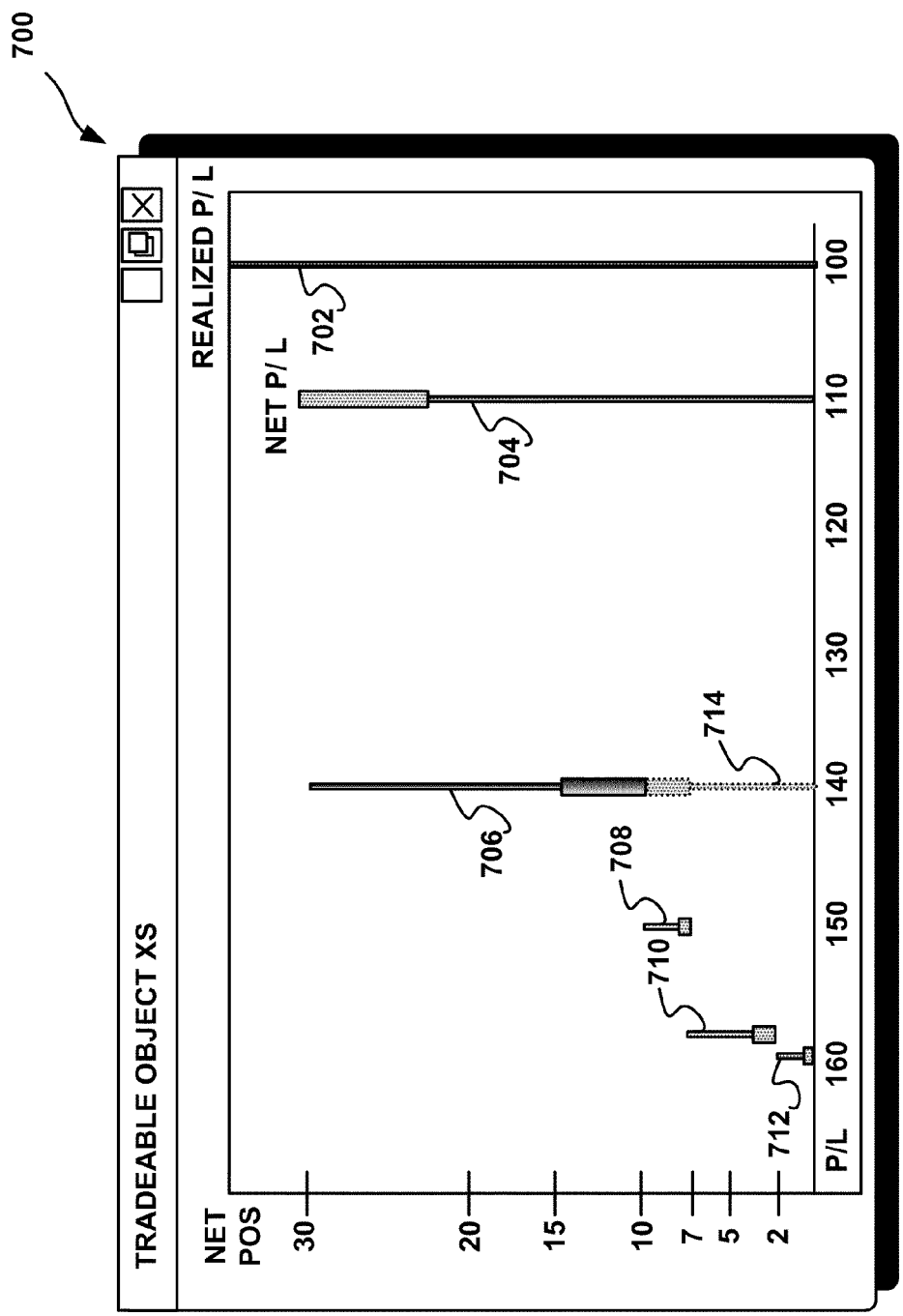
FIG. 7 illustrates one example embodiment for displaying a plurality of working order indicators in combination with a Net P/L indicator and a Realized P/L indicator.

The working order indicators could be also displayed in combination with the Net P/L indicator and the Realized P/L indicator. FIG. 7 illustrates one example embodiment for displaying a plurality of working order indicators in combination with a Net P/L indicator and a Realized P/L indicator.

The graphical interface 700 displays a Realized P/L indicator 702, a Net P/L indicator 704 that is based on a market price and the net position that a trader is holding, so that the indicator 704 moves based on the market movements. The graphical interface also includes a plurality of working order indicators 706, 708, 710, and 712. Therefore, when the market moves to the price level associated with the first working order 706, and the order gets filled, the Net P/L indicator will move to the P/L level corresponding to the first order 706. Additionally, since the net position will be decreased as the result of the fill, the length of the Net P/L indicator will decrease as well. An example, Net P/L indicator 714 is displayed to illustrate such an embodiment. It should be understood that if the market moves to price levels associated with other working orders, the Net P/L indicator will move to the P/L positions associated with the orders, and the length of the Net P/L indicator will decrease respectively. Therefore, once all working orders get filled, and if the working order quantity is equal to the net position, the Realized P/L indicator 702 will move to the P/L level corresponding to the working order indicator 712.

Figure 8:
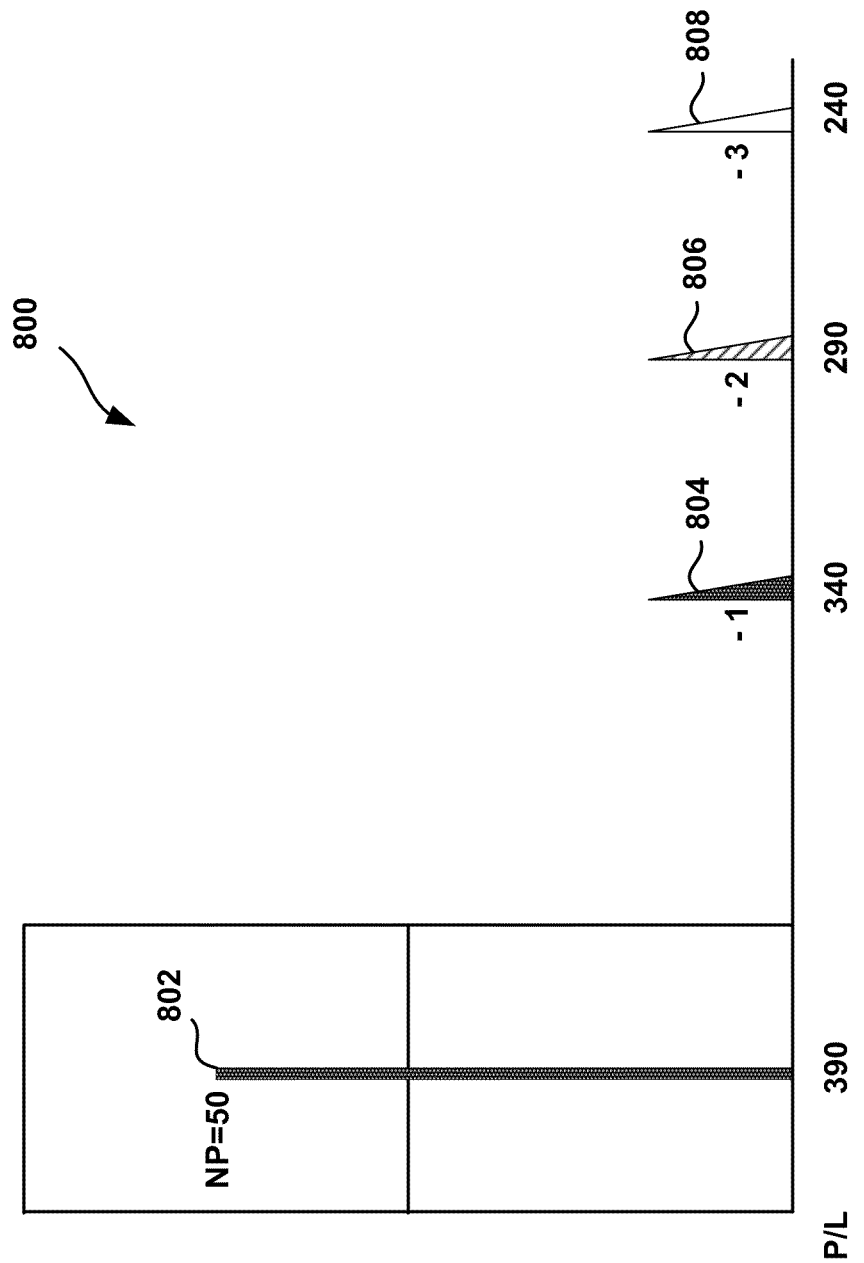
FIG. 8 is a block diagram illustrating an example graphical interface for displaying a plurality of potential profit levels determined based on potential market movements.

FIG. 8 is a block diagram illustrating a graphical interface 800 for displaying a plurality of net profit levels based on potential market movements. More specifically, the graphical interface displays a Net P/L level indicator 802 associated with a Net P/L level of 390 and a Net position ("NP") of 50. The graphical display interface 800 displays a number of graphical indicators associated with a plurality of potential P/L levels that may result when the market moves against the trader's position, e.g., as if the trader were to get out of or close his position at that point in time. As shown in FIG. 8, three potential profit levels 804, 806, and 808 are illustrated based on the market dropping by 1, 2, and 3 ticks from the current market level, respectively. Using the potential profit indicators 804, 806, and 808, the trader can easily view potential profit levels such as if the market was to move against the trader's position. Thus, for example, if the market moves 1 tick against the trader's position, the trader's net profit, as shown at 804, will decrease to 340 (390-current Net P/L minus 50-net position multiplied by 1 tick). Similarly, as shown at 806 and 808, if the market moves 2 and 3 ticks down from the current market level, the trader's net profit will decrease to 290 and 240, respectively.

It should be understood that the potential net P/L indicators may be based on the trader's average loss. In such an embodiment, the money management module may determine a trader's average loss during a trading day based on an average number of ticks that a trader tends to lose on losing trades. For example, the money management module may dynamically update the trader's average loss during a trading day based on the trader's performance. Alternatively, the trader's average loss may correspond to a specific time interval such as the last hour of the trader's trading. It should be understood that a trader or system administrator may specify how and based on what time interval the average loss is calculated. Then, the trader's average loss may be used to determine another set of potential Net P/L indicators. It should be understood that many different embodiments are possible as well. For example, all potential net P/L loss indicators displayed via the interface 800 may be based on the trader's average loss rather than the fixed tick loss. For example, the indicator 806 could correspond to a potential Net P/L determined based on the trader's average loss, the indicator 804 may correspond to Net P/L determined based on one half of the trader's average loss, and the indicator 806 may correspond to Net P/L determined based on twice the trader's average loss.

The average loss, similarly to the realized P/L level, may be computed when the trader's net position reaches or crosses the zero level. It should be understood that different indicators associated with the trader's loss information can be displayed as well. For example, the money management module or the trading application could compute a percentage of losing orders (e.g., orders that resulted in the loss of profit), and the average cost of each loss, the values of which could be displayed via the graphical interface 800. Further, as will be described in greater detail below, trader's average loss could also be used as one of the factors in determining when the trader is moved to the lower money management filter.

As mentioned in earlier paragraphs, the open, net, and realized P/L level indicators may be displayed in combination with the graphical display of money management filters so that the trader not only can view his profit levels but also can quickly and clearly view any trading constraints (controlling parameters) that he/she might have to use if the market moves in or against his/her position. According to one example embodiment, a money management filter may be defined using one or more filter criteria and filter conditions. For example, filter criteria may include one or more of the following criteria: Open P/L, Realized P/L, Net P/L, trader's net position, available credit, a number of transactions, a transaction/fill ratio, a change in net position, or a type of tradeable object, and any other trader-related or market-related data. Further, as mentioned in earlier paragraphs, it should be understood that the P/L levels associated with filter criteria may be calculated for a specific tradeable object or a combination of tradeable objects being traded by a trader.

FIG. 9 is a block diagram illustrating an example money management interface 900 that a trader or a system administrator may use to define filter criteria and filter conditions.

According to one embodiment, a trader or a system administrator may define via a profile name window 902 a filter profile that may include a combination of filters. The filters in the filter profile may be based on different filter criteria, however, if two or more filters are applicable to the incoming order, and their filter conditions conflict, the most conservative filter condition will preferably be used. Alternatively, a filter may be configured so that only filter conditions associated with the filter will control order parameters even if another filter associated with a different set of filter conditions applies. Further, the profile may be created for a predetermined tradeable object or a group of tradeable objects being traded by the trader, and the trader may select one or more tradeable object to be associated with the profile using a tradeable object pull down menu 904. In the embodiment illustrated in FIG. 9, the filter criteria 906 are based on the Open P/L level, and each filter is associated with a P/L threshold level 908 that then maps to a number of filter conditions including a maximum order quantity 912 and a maximum net position 914. However, it should be understood that the filter criteria may be based on the Net P/L level or a combination of different P/L levels. In addition to each P/L threshold level, a trader may also define one or more retraction levels that are configured to limit trader's losses once a trader reaches a predetermined profit level. It should be understood that the profit levels and retraction levels may be defined using many methods. For example, the profit levels and retraction levels may be defined in ticks or currency, and the retraction levels could also be defined as a percentage of the maximum P/L.

Referring to the example in FIG. 9, when a trader reaches the Open P/L level of 10, the trader may trade the maximum order quantity of 5 and may hold the maximum net position of 10. As mentioned earlier, the net position may be determined using different methods, and a trader or system administrator may define which orders are taken into consideration to calculate the net position. As shown in FIG. 9, once the trader's open P/L reaches the value of 10 and then falls to the level of 7, as shown in the retraction level column 910, the trader's ability to trade is limited to the order quantities of 3 and the maximum net position of 6. Referring to the next retraction level under the same Open P/L threshold level, when the trader's Open P/L reaches the level of 5, the trader is limited to trade order quantities of 3 to trade down to the position of 0.

Once a trader creates a filter profile, the trader may save the profile by simply selecting a save selection input 916. Alternatively, the trader may quickly delete the profile by selecting a delete selection input 918. Further, alternatively, the trader may quickly exit the money management setup interface 900 by selecting a cancel selection input 920. Once the filter profile is saved, the trader may easily retrieve and edit the profile's filter criteria and conditions by selecting the profile's name using the pull down profile menu 902. In one embodiment, when a system administrator configures money management filters for a group of traders, the system administrator may set up authorization rules defining one or more traders or system administrators who can create, edit, enable, disable, or reset limits created for the group of traders.

Filter selection may be modified based on the trader's performance such as a percentage of losing trades, or average cost of all losses incurred by a trader during a trading day. In one example embodiment, in addition to selecting a specific filter for a trader based on a trader's P/L level and other parameters described above, the money management module may monitor a number of losing trades associated with the trader when the trader is being controlled by a predetermined filter and then use that number as a filter selection overriding mechanism. For example, a trader may configure a number of losing trades that a trader may incur while being controlled by a specific filter. In such an embodiment, if a trader's P/L level drops to a level that should enable a more restricting filter, and the number of trader's losing trades while the trader's was controlled by the higher filter was lower than the configured value, then, the less restricting filter may still control the trader's trading until another losing trade is detected, for example. In one embodiment, a number of losing trades that would allow a trader to remain under the control of the less restricting filter could be user configurable.

It should be understood that other filters could also be used, and additional filters have been described in greater detail in U.S. patent application Ser. No. 10/355,471, filed on Jan. 31, 2003, entitled "System and Method for Money Management in Electronic Trading Environment," the contents of which are fully incorporated herein by reference.

Once a trader defines one or more money management filters, the trader may view the trader-related data as well as any filter conditions being currently imposed on each tradeable object via another graphical interface. FIG. 10 is a block diagram illustrating a monitoring interface that allows a trader to view market conditions and limitations imposed on each tradeable object or a group of the tradeable objects associated with the created filters. As shown in FIG. 10, the money management monitoring interface 1000 displays a name of each profile 1002, a name or names of tradeable object(s) 1004 associated with each profile, "limits on" indicators 1006 that may be used to enable filters for the specific tradeable object, a quantity associated with working orders 1008, a trader's net position 1010, a maximum P/L 1012 and a minimum P/L 1014 determined for a trader during a trading day, a current P/L 1016, as well as effective current limits 1018 including a maximum net position and a maximum order quantity that are currently imposed on a trader based on the trader's current P/L level. It should be understood that when a profile is created for more than one tradeable object being traded by a trader, the current P/L 1016 may display the P/L level associated with each tradeable object as well as the combined P/L level associated with all or some tradeable objects in the profile. It should be understood that the current P/L 1016 can be associated with any P/L specified by the trader such as an Open, Realized, Net P/L level, or the combination thereof. It should be understood that a trader may add or delete columns in the money management interface 1000 and specify which of the described or additional parameters are to be displayed via the interface.

According to an example embodiment, trader's profit related information as well as filter related information may be displayed to a trader via a single graphical interface. FIG. 11 is a block diagram illustrating a graphical interface 1100 that displays trader related P/L information in combination with money management filter related data. The graphical interface 1100 displays a number of filter triggers 1126 associated with a plurality of P/L trigger levels that, in this example, are associated with Net P/L trigger levels. According to an example embodiment, each P/L trigger level maps to one or more filters defining a maximum order quantity and a maximum net position. More specifically, and as illustrated in FIG. 11, when a trader's Net P/L reaches one of the P/L triggers 1126, the trigger corresponding to the trader's Net P/L level may be highlighted so that the trader can easily tell which filter level or filter band is used to currently control the trader's trades.

When the trader reaches one of the predetermined P/L level corresponding to the triggers 1126, the graphical interface 1100 may display via a money management filter region 1104 one or more filters corresponding to that P/L trigger. As illustrated in FIG. 11, the P/L trigger level of 300 corresponds to four filters including the main filter 1128, and three loss-limiting filters 1130, 1132, and 1134. The main filter 1128 controls the orders being sent by a trader to an exchange when the trader's open P/L level is between 300 and 450 profit levels. More specifically, the filter 1128 limits the order quantity that a trader may submit to the exchange to the maximum order quantity of 44, and further limits the trader's net position to the maximum net position of 88. However, if the trader's profit level does not reach the higher profit trigger, e.g., 450 in this example, and instead drops to the profit level lower than 300, then one of the loss-limiting filters corresponding to the Net P/L trigger level of 300 controls the trader's orders. For example, if the trader's Net P/L drops to a profit level between the 200 and 300 profit range, filter conditions associated with the filter 1130, e.g., a maximum order quantity of 31 and a net position of 62, may control the orders being sent by the trader. Similarly, when the trader's profit is in the profit range of 200 and 150, filter conditions associated with the filter 1132, including a maximum order quantity of 24 and a maximum net position of 48, control the trader's orders being sent to the exchange. Finally, when the trader's profit level reaches the profit level below 150, the trader is limited to the order quantity of 16 and a net position of 0 so that a trader is forced to trade out rather than to submit orders that increase the trader's net position.

It should be understood that once a trader is in a predetermined filter band, such as the one shown in FIG. 11, the trader's trading is controlled by the filter conditions of that band. In the example embodiment of FIG. 11, once a trader reaches the P/L of 450, filters 1128, 1130, 1132, and 1134 associated with the filter trigger of 450 may control the trader's trading. Similarly, once the trader's P/L drops to the P/L level of 180, the trader's trading will be controlled by the filter conditions associated with the filter 1132 rather than some other filter that is associated with a different band and having the same P/L level as one of its filter criteria.

Additionally, it should be understood that the present invention is not limited to the graphical interface described in reference to FIG. 11. Alternatively, instead of displaying a plurality of filters within the money management region 1104, the money management region 1104 may be color-coded so that, for example, different colors or different shades of the same color correspond to different sets of money management parameters, such as different maximum order quantities and maximum net positions. Different embodiments are possible as well.

According to one embodiment, in addition to selecting applicable filters based on the profit levels, other methods may be provided to a trader to further control filter selection. One example method is a permanent pullback that prevents the trader from advancing to a higher filter once the trader drops to the lower one. To illustrate the permanent pullback option, lets assume that the trader's trades are being initially controlled by the filter 1130, and then the trader starts losing money and drops down to the lower filter such as the filter 1132. With the permanent pullback enabled, even when the trader advances back to the profit level associated with the filter 1130, the trader is still limited by the filter conditions associated with the filter 1132.

In one embodiment, even with the permanent pullback enabled, a trader may be able to advance to a higher filter only when the trader gets to a profit level that advances the trader to another filter band, such as P/L of 450 in FIG. 11. It should be understood that two indicators associated with the permanent pullback option and the band advance option may be displayed to a trader when the filter configures filter parameters via a filter configuration window. However, it should be understood that a trader may enable the permanent pullback at any time during trading as well. Additionally, it should be understood that the permanent pullback could be disabled at other times of the trader's trading, such as when the trader advances a predetermined number of filters within the filter band.

In addition to displaying a number of money management filters, the money management region 1104 also displays profit indicators that are dynamically updated during a trading day to reflect current profit levels associated with the trader. It should be understood that a trader may select which of the profit indicators are displayed via the money management filter region 1104. FIG. 11 illustrates two P/L indicators including a Net P/L indicator 1124 and a Realized P/L indicator 1122 that are dynamically updated throughout the trading day upon detecting a change in the corresponding profit levels. As shown in FIG. 11, the Realized P/L is at 175, and the Net P/L is at 400. It should be understood that a trader may configure graphical representation of each profit indicator, such as the shape or color of each indicator, so that the trader can easily distinguish between the two or more indicators.

Also as shown in FIG. 11, the profit indicators correspond to a predetermined tradeable object, here the tradeable object XS 1102. However, alternatively, additional profit indicators could be displayed via the money management region 1104, such as overall profit indicators determined based on P/L levels associated with all or some tradeable objects being traded by the trader. Further, as explained in reference to FIGS. 6 and 7, the money management filter region 1104 could also display a plurality of P/L indicators determined based on working orders that a trader has on the market. It should be understood that if a trader has a large number of working orders on the market, the potential profit levels associated with those orders may be combined and displayed using a single P/L indicator.

The graphical interface 1100, in addition to the graphical indicators, may also display a number of numerical indicators. As illustrated in FIG. 11, the indicators include a working buy order indicator 1106 that displays a working buy quantity of 20, a working sell order indicator 1108 that displays a working sell quantity of 0, and a trader's net position 1110 that displays a trader's net position of −20. In addition to displaying P/L levels using graphical indicators, the P/L levels may be displayed using numerical P/L indicators 1112. The P/L indicators 1112 correspond to the Net P/L levels and include the maximum Net P/L level of 414 that the trader has held during the trading day, the minimum Net P/L level of −249, and the current Net P/L level of 400. It should be understood that the profit levels may be distinguished using different colors or graphical indicators.

It should be understood that the graphical interface could also display numerical indictors related to other types of P/Ls such as Realized and/or Open P/L levels. As illustrated in FIG. 11 at 1114 and 1116, instead of defining one maximum order quantity, each filter may be associated with different maximum order quantities depending on whether a trader submits a buy or sell order. The graphical interface 1100 may also display numerical indicators 1118 and 1120 associated with the maximum order quantity and the maximum position that a trader may hold based on the trader's current profit level. In FIG. 11, numerical values for the indicators 1118 and 1120 are determined based on the trader's net P/L level associated with the tradeable object XS 1102. However, it should be understood that the values may be determined based on any user-configurable profit level associated with one or more tradeable objects being traded by one or more traders.

A trader may also use the money management filter region 1104 for filter configuration purposes. For example, when the graphical interface 1100 is opened for the first time, the money management filter region 1104 can display a plurality of default filter/money management regions such as the regions 1128, 1130, 1132, and 1134. Then, a trader may click on each of the regions to configure the maximum order quantity, the maximum net position, and the profit range for each of the regions. In one embodiment, a trader may simply change default values being displayed in association with each filter to desired values. Alternatively, a trader may click on the filter region, and a pop-up window could be displayed via which a trader may enter filter criteria and conditions for one or more filters. In another embodiment, a trader may configure the filters using a configuration interface such as the one illustrated in FIG. 9, for example, and once the configuration is finished, the configured filters may be displayed via the money management filter region 1104. Alternatively, a trader may simply drag the boundaries of each filter region to desired locations corresponding to a predetermined profit range, as well as a maximum order quantity and a maximum net position.

Alternatively, a configuration selection input may be displayed on the graphical interface 1100 that, when selected, may invoke another window via which the trader can configure a number of filters for each of the trigger levels. FIG. 12 is a block diagram illustrating an example graphical interface 1200 via which a trader can configure a plurality of filters for each of the P/L trigger levels. The graphical interface 1200 may be invoked when the trader specifies P/L trigger levels via the graphical interface 1200 and then selects a configuration selection input to configure a plurality of money management filters for each of the levels, for example. The graphical interface 1200 displays only three P/L trigger levels; however, it should be understood that a trader could specify more or fewer trigger levels. Each profit level may be displayed in association with a plurality of default filter regions 1202, 1214, and 1224, and a trader may configure numerical values for each filter criteria and filter conditions by simply modifying default values being displayed in association with each filter to the desired values, or by dragging the edges of each filter to the desired profit, quantity and net position levels.

FIG. 12 illustrates three profit trigger levels including P/L trigger levels of 150, 300, and 450, respectively. Each of these P/L trigger levels is then associated with a plurality of filters, so that, for example, the P/L trigger 450 is associated with five filters 1204, 1206, 1208, 1210, and 1212, and the P/L triggers 300 and 150 are associated with four filters each, 1216, 1218, 1220, and 1222 for the P/L trigger 300, and filters 1226, 1228, 1230, and 1232 for the P/L trigger 150. However, it should be understood that more or fewer filters could be configured for each P/L trigger level. For example, a trader may simply select an add selection input 1234, 1240, or 1246 being displayed in one of the P/L trigger regions to add another filter to that P/L trigger level. Similarly, a trader may delete one or more default filters by first selecting a default filter block in the P/L trigger region 450, and then selecting a delete selection input corresponding to that region, such as one of the delete selection inputs 1236, 1242, and 1248. Once a trader configures all filters for a P/L trigger, the trader can then save the filters by simply selecting a corresponding save selection input such as one of the save selection inputs 1238, 1244, or 1250, respectively, depending on which P/L trigger level the filters correspond to.

The money management filters are not limited to the filters described above, and more or fewer filters could be created for a tradeable object. Some of the additional filters may be time-based so that they are triggered at specific time periods. In addition to time being a trigger, the time-based filters may also have other triggers, such as triggers related to trader data, exchange data, or data from outside sources. For example, a set of time-based filters may be created to complement any other filter conditions when a predetermined time period is detected. In such an embodiment, when two or more filter conditions conflict, the more conservative one will control. For example, a time-based filter, such as a filter effective between 8 a.m. and 9 a.m., may be triggered upon receiving an employment number. Once the employment number is detected, the filter may prevent the trader from trading or limit the trader to trading very small order quantities. In one embodiment, time-based filters may be configured to completely overwrite any other filter conditions for the time period associated with the time-based filter. It should be understood that different outside triggers could also be used in addition to the employment numbers. For example, during the last twenty minutes of trading before the market closes, any filters that are applied to trader's orders may be overridden or supplement by filter conditions of another set of filters created for the market closing time period. Such filters may be designed so that the trader completely trades out of his positions.

In one embodiment, a graphical interface, in addition to the applicable filter band and P/L indicators, could also display indicators associated with time-based filters. FIG. 13 is a block diagram illustrating a graphical interface 1300 for displaying a money management filter band in combination with P/L indicators and time-based filter indicators. The graphical interface 1300 includes a time-based filter region including a plurality of time-based filter indicators 1304, 1306, and 1308. For example, the first indicator 1304 may correspond to an employment number filter, the second indicator 1306 may correspond to one or more filters that are triggered based on some news event, and the third filter 1308 may correspond to the market closing time-based filter.

It should be understood that each filter may be labeled with an indicator defining the type of the filter, and the time-based filters may overlap. When the time-based filters overlap, the most conservative conditions may be control the order parameters. Alternatively, if there is more than one filter that controls order parameters at any given time, a trader or a system administrator may control which one of them will be applied to orders being sent to the exchange. For example, each filter may be assigned a predetermined priority level so that when more than one filter is applicable during a predetermined time period, only filter conditions associated with filters having the same priority levels are merged. It should be understood that different methods for determining which filter conditions should apply at any given time period could also be used, and the present embodiments are not limited to labeling each filter with a priority level. Further, other filters could be created to turn all filter restrictions off for a predetermined time period so that a trader can trade any order quantities and can hold any net position that the trader desires during the time period defined by the order.

It should be understood that time-based filters may be configured using the methods described above, and each time-based filter may be associated with one or more filter bands including one or more filters. Additionally, once the time-based filter is triggered, the time-based filters may be displayed via the money management window so that the trader may quickly and easily view the applicable filters. In one embodiment, the time-based filter may be superimposed over any other filters displayed via the interface such as in the embodiment illustrated in FIG. 13, where the time-based filter 1310 is displayed in combination with other applicable filters. It should be understood that different configurations are possible as well, and a trader may configure the interface so that only the most conservative of the applicable filters is displayed via the interface, or when the filters are superimposed, the overlay of the filters can be shaded so that the trader can easily view a maximum order quantity and a maximum net position for different profit ranges.

Once the filter conditions such as the maximum order quantity and the maximum net position are configured, a trader or a system administrator may verify the filter conditions by applying different drop off loss conditions to the created filter. FIG. 14 is a graphical interface 1400 that may be used for verifying and changing filter conditions configured by a trader or a system administrator using different potential profit loss conditions. The graphical interface 1400 includes a money management filter window that displays a plurality of money management filters 1404, 1406, 1408, and 1410 created for a trader or a group of traders trading a tradeable object XS 1402. Once the filters are displayed, a trader or a system administrator may enable a display of potential profit indicators to verify if the filters have been set up according to his/her needs. For example, in FIG. 14, a plurality of one-tick potential profit loss indicators 1412, 1416, 1418, and 1420 are displayed, and the slope of each indicator is determined based on a single tick loss (a number of contracts*tick loss per contract) so that, for example, referring to the first filter, a one tick profit loss for 50 contracts corresponds to 50 ticks of P/L loss, as shown on the x-axis. It should be understood that even though the slope corresponding to a one tick loss should be 1:1, the slope of the displayed potential profit loss indicators, as illustrated in FIG. 14, is not a 45-degree line since the scales on the two axis corresponding to the quantity axis and the profit level axis are different.

Referring to FIG. 14, the indicator 1412 corresponds to a one tick profit loss and may be used by a trader or system administrator to determine if the set filter configurations are what the trader really anticipated. For example, based on the indicator, the trader may quickly determine that a loss of one tick at the net position of 50 will result in the trader's dropping out of the first filter associated with the maximum net position of 50 and the maximum order quantity of 30. If this is what a trader desires, the trader may leave the filter configuration unchanged. Alternatively, the trader may increase the profit range corresponding to the filter 1404 so that a higher loss is allowed before another filter such as the filter 1406 controls the trader's trading.

The indicator 1412 could also be used to visually and quickly determine what would happen at other net positions levels. For example, as shown in FIG. 14, if the trader's Realized P/L level were at 500 and the trader then trades so that his/her net position becomes 45, the trader can easily determine that a loss of one tick ($\Delta 1$) would keep the trader in the same filter, however, a loss of two ticks ($\Delta 2$) would move the trader to the second, more restricting, filter 1406, where the trader's maximum order quantity and net position would be lowered to 20 and 40, respectively.

Similarly, referring to the filter 1406, the indicator 1416 also corresponds to one tick loss, and as shown in FIG. 14, if the trader's net position were 15, the trader would be allowed to lose about 5 ticks before his trades would be controlled by less favorable filter conditions of the filter 1408. It should be understood that the profit loss indicators are not limited to the one tick loss indicators, and the indicators could be based on any number of ticks, such as 2, 3, 4, and could be user-configurable. Alternatively, the money management application or the trading application may determine an average tick loss associated with the trader's trades, and another indicator associated with the trader's average tick loss may be displayed in addition to any other indicators. It should be understood that the indicators may be distinguished using different colors or different indicator types that could be user-configurable.

In addition to verifying filter configurations during filter set up, the profit loss indicators may be used to provide a trader with a quick indication of a potential risk before a trader enters into any position. According to one embodiment, a potential profit loss indicator may be displayed to a trader in relation to the Realized P/L indicator. Further, the indicator may be displayed when the money management application detects that the trader's net position is equal to zero, so that before the trader decides to enter any new orders, the trader can quickly view his/her potential risk based on different potential order quantities.

FIG. 15 is a block diagram illustrating an interface 1500 that displays potential profit loss indicators in relation to a trader's Realized P/L indicator. The interface 1500 displays a money management window 1504 including a plurality of money management filters 1506, 1508, 1510, and 1512. Further, the money management interface 1500 displays a profit loss indicator 1514 in relation to the Realized P/L indicator 1516. In one embodiment, the indicator 1514 may be displayed to a trader when the trader's net position is flat so that before a trader enters any new orders, the trader can easily view his potential profit losses based on the order quantity that the trader is planning to trade. Further, using the indicator 1514, the trader may easily predict his potential filter drop, e.g., a filter that would control the trader's trades, if the market goes against his position. It should be understood that in addition to showing the potential profit loss indicators, such as the indicator 1514, the graphical interface 1500 could also display indicators related to positive market movements, e.g., indicators corresponding to the potential profit gain rather than loss. In such an embodiment, for example, a one tick potential profit gain indicator could be displayed, where the indicator's slope would be negative, rather than positive as in the indicator 1514.

Referring to FIG. 15, the Realized P/L indicator corresponds to a current Realized P/L level of 460, and the profit loss indicator 1514 may be used to determine where the trader's profit would be and what filter would control the trader's trading if the trader were to enter into a position between 1 and 50 as defined by the first filter. For example, if a trader enters one or more orders so that a trader's net position becomes 45, a trader is risking a drop to the third filter 1510 and a loss of 90 ticks if the market were to move two ticks against the trader's position. Further, for example, the trader can easily determine that keeping the net position of 30 rather than 45 would result in a much smaller risk and much smaller profit loss. First the loss of two ticks would cause the trader's trading to be controlled by the second filter 1508 rather than the third filter 1510, and the P/L loss that the trader would incur would be much lower compared to the loss of two ticks when the trader's position is 45. However, rather than viewing potential P/L in terms of losses, a trader may view potential P/L in terms of profit gains so that the higher net position would result in much higher profit gain compared to the lower potential net position. Therefore, another set of potential gain profit indicator could be displayed in addition to potential loss indicators for a plurality of market movements.

In addition to the maximum order quantities and maximum net position associated with each filter, a trader or an administrator may create a plurality of trade-out exceptions to enable a trader to exit his open positions. Such exceptions may be used when the market moves against the trader's position causing the trader's orders to be controlled by a filter associated with a maximum net position that is significantly lower than the position being currently traded by the trader so that the trader is forced to lower his position by selling or buying until he reaches the maximum net position, for example.

To illustrate one example trade-out mechanism, let's assume that at time $t_o$, a trader is holding a net position of 40 and has no working orders on the market, and the money management filter that controls the trader's orders based on the trader's current open P/L level, for example, is associated with a maximum net position of 50, and a maximum order quantity of 15. Then, let's assume that at time $t_1$, the market moves against the trader position, causing the trader's orders to be controlled by a different filter associated with a maximum net position of 15, and a maximum order quantity of 7. However, because the trader's net position of 40 is much higher than the maximum net position of 15 associated with the current filter, the trader will not be able to send orders to the market quickly enough to get out of his position in case of unfavorable and fast market movements. In such an embodiment, a set of trade-out rules may be created to enable a trader to lower his position to the one specified by the controlling filter. Such overriding rules may be automatically enabled whenever a limit condition such as the one explained above is detected. Alternatively, a user selection input may be displayed to a trader when such a condition is detected, and the trader may enable the trade-out mechanism by selecting such a selection input.

According to one example embodiment, a trade-down quantity may be first calculated to enable a trader to trade down to the maximum net position associated with the current filter. The trade-down quantity may be calculated by first subtracting the current trader's position from the maximum net position associated with the filter, and then taking the absolute value of the result, which in the example presented above would be |15−40|=25. Then, the trade-out quantity may be determined by taking the maximum of the absolute value calculated above and the maximum order quantity associated with the filter, which would be 25 in the above example, i.e., max (25,7). Therefore, using such a mechanism, the trader can submit a sell order of 25, which when filled, would cause the trader's net position to reach the maximum net position of 15.

Another rule may be created if the trader wants to trade down to zero when the trader has the working order of 25 pending on the market. Once again a user selection input may be provided via the interface to enable the trader to select such an option. The maximum trade-down to zero quantity may be determined by taking the minimum of the working quantity (25 in this example) and a difference between the trader's net position (40) and the working quantity (25), thus, taking minimum (25,15) in this example, which is 15. It should be understood that different or equivalent trade-out mechanisms could also be used, and the present invention is not limited to the embodiment illustrated above. Further, for example, a set of rules may be created limiting price levels at which a trader can place the trade-out orders on the market.

It should be understood that the above description of the preferred embodiments, alternative embodiments, and specific examples, are given by way of illustration and should not be viewed as limiting. Further, many changes and modifications within the scope of the present embodiments may be made without departing from the spirit thereof, and the present invention includes such changes and modifications. For example, the present invention is not limited to the filter configurations described hereinbefore, and those skilled in the art will understand that different configuration methods could also be used.

Further, it will be apparent to those of ordinary skill in the art that methods involved in the system and method for money management in an electronic trading environment may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A method for money management in an electronic trading environment, the method comprising:

receiving, via a client device having an electronic processor, a request to submit an order for a tradeable object to an electronic exchange for trading the tradeable object according to a match algorithm of the electronic exchange, the order having original order parameters;

determining, via the client device, a net profit level for a trader at least in part according to market information for the tradeable object and a net position, the net position being a difference between a purchased quantity of the tradeable object by the trader during a time period and a sold quantity of the tradeable object by the trader during the time period;

selecting, via the client device, at least one money management parameter from a plurality of money management filters according to the net profit level; and prior to submitting the order from the client device to the electronic exchange, filtering, via the client device, the original order parameters according to the at least one money management parameter to determine whether to submit the order with the original parameters, modify the original parameters before submitting the order, or prevent the order from being submitted.

2. The method of claim 1 further comprising preventing the order from being submitted in response to determining to reject the order according to at least one money management parameter.

3. The method of claim 1 further comprising:
modifying at least one of the original parameters to a modified parameter according to the at least one money management parameter; and
submitting the order having the modified parameter.

4. The method of claim 1 further comprising submitting the order having original parameters according to the at least one money management parameter.

5. The method of claim 1 where market information for the tradeable object comprises a market price for the tradeable object.

6. The method of claim 5 where the market price comprises a last traded price.

7. The method of claim 1 where at least one money management parameter comprises at least one of a maximum order quantity and a maximum net position.

8. The method of claim 7 where filtering comprises modifying an order quantity of the order according to the maximum order quantity.

9. The method of claim 7 where filtering comprises preventing the order from being sent to the electronic exchange in response to determining that the order would increase the net position in excess of the maximum net position.

10. The method of claim 1, where determining the net profit level comprises determining an overall net profit level according to a plurality of net positions, where each net position of the plurality of net positions is associated with a corresponding tradeable object of a plurality of tradeable objects and market information for the corresponding tradeable object of the plurality of tradeable objects, where the at least one money management parameter is determined according to at least the overall net profit level.

11. The method of claim 1 where the client device comprises a distributed network of devices.

12. The method of claim 11 where the distributed network of devices comprises a gateway.

13. A computer readable medium having instructions stored therein, which when executed by a processor cause the processor to carry out acts comprising:
receiving a request to submit an order for a tradeable object to an electronic exchange for trading the tradeable object according to a match algorithm of the electronic exchange, the order having original order parameters;

determining a net profit level for a trader at least in part according to market information for the tradeable object and a net position being a difference between a purchased quantity of the tradeable object by the trader during a time period and a sold quantity of the tradeable object by the trader during the time period;

selecting at least one money management parameter from a plurality of money management filters according to the net profit level; and prior to submitting the order from the client device to the electronic exchange, filtering the original order parameters according to the at least one money management parameter to determine whether to submit the order with the original parameters, modify the original parameters before submitting the order, or prevent the order from being submitted.

14. The computer readable medium of claim 13 where the acts further comprise preventing the order from being submitted in response to determining to reject the order according to at least one money management parameter.

15. The computer readable medium of claim 13 where the acts further comprise:
modifying at least one of the original parameters to a modified parameter according to the at least one money management parameter; and
submitting the order having the modified parameter.

16. The computer readable medium of claim 13 where the at least one money management parameter comprises at least one of a maximum order quantity and a maximum net position, where filtering comprises modifying an order quantity of the order according to the maximum order quantity and preventing the order from being sent to the electronic exchange in response to determining that the order would increase the net position in excess of the maximum net position.

17. The computer readable medium of claim 13 where determining the net profit level comprises determining an overall net profit level according to a plurality of net positions, where each net position of the plurality of net positions is associated with a corresponding tradeable object of a plurality of tradeable objects and market information for the corresponding tradeable object of the plurality of tradeable objects, where the at least one money management parameter is determined according to at least the overall net profit level.

18. A system for money management in an electronic trading environment, the system comprising:
an input device configured to receive a submission for an order for a tradeable object to an electronic exchange for trading the tradeable object according to a match algorithm of the electronic exchange, the order having original order parameters;
a processor coupled with the input device and configured to determine:
a net profit level for a trader at least in part according to market information for the tradeable object and a net position, the net position being a difference between a purchased quantity of the tradeable object by the trader during a time period and a sold quantity of the tradeable object by the trader during the time period, and
at least one money management parameter from a plurality of money management filters according to the net profit level; and
an order processor configured to filter the original order parameters according to the at least one money management parameter to determine whether to submit the order with the original parameters, modify the original parameters before submitting the order, or prevent the order from being submitted.

* * * * *